United States Patent
Davis et al.

(10) Patent No.: US 11,220,979 B1
(45) Date of Patent: Jan. 11, 2022

(54) LIQUID-COOLED AIR-BREATHING ROCKET ENGINE

(71) Applicant: Mountain Aerospace Research Solutions, Inc., Whitefish, MT (US)

(72) Inventors: Aaron Davis, Whitefish, MT (US); Scott Stegman, Santa Barbara, CA (US)

(73) Assignee: Mountain Aerospace Research Solutions, Inc., Whitefish, MT (US)

( * ) Notice: Subject to any disclaimer, the term of this patent is extended or adjusted under 35 U.S.C. 154(b) by 0 days.

(21) Appl. No.: 17/094,716

(22) Filed: Nov. 10, 2020

(51) Int. Cl.
| | |
|---|---|
| *F02K 7/18* | (2006.01) |
| *F02K 9/52* | (2006.01) |
| *F02K 9/97* | (2006.01) |
| *F02K 9/95* | (2006.01) |
| *F02K 9/64* | (2006.01) |
| *F23R 3/46* | (2006.01) |

(52) U.S. Cl.
CPC ............... *F02K 7/18* (2013.01); *F02K 9/52* (2013.01); *F02K 9/64* (2013.01); *F02K 9/95* (2013.01); *F02K 9/972* (2013.01); *F23R 3/46* (2013.01)

(58) Field of Classification Search
CPC ..... F02K 7/18; F02K 9/52; F02K 9/64; F02K 9/972
See application file for complete search history.

(56) References Cited

U.S. PATENT DOCUMENTS

| | | | | | |
|---|---|---|---|---|---|
| 2,735,263 | A | * | 2/1956 | Charshafian | F02K 7/18 60/260 |
| 3,200,589 | A | * | 8/1965 | Mower | F02K 9/52 60/39.461 |
| 3,693,354 | A | * | 9/1972 | Hull, Jr. | F23R 3/20 60/765 |

(Continued)

FOREIGN PATENT DOCUMENTS

| | | |
|---|---|---|
| CA | 2677423 A1 | 8/2008 |
| EP | 1515035 A2 | 3/2005 |

(Continued)

OTHER PUBLICATIONS

U.S. Appl. No. 16/828,285, filed Mar. 24, 2020.
U.S. Appl. No. 16/776,325, filed Jan. 29, 2020.

*Primary Examiner* — Todd E Manahan
*Assistant Examiner* — Kyle Robert Thomas
(74) *Attorney, Agent, or Firm* — Perkins Coie LLP; Jordan Becker

(57) ABSTRACT

An air-breathing rocket engine in certain embodiments comprises an outer shell and an interior portion situated entirely within the front end of the outer shell. The interior portion includes a funnel-shaped intake and an annular primary combustion chamber between the inner front wall of the shell and the outer surface of the funnel-shaped intake. The intake has a central aperture that is in fluid communication with the throat and exhaust areas within the outer shell. A second circumferential gap is formed between the outer surface of the front inner wall and the inner surface of (Continued)

the front end of the outer shell and is in fluid communication with the throat and exhaust areas within the outer shell. One or more injector ports and one or more ignition ports are situated at the front end of the second circumferential gap.

15 Claims, 19 Drawing Sheets

(56) References Cited

U.S. PATENT DOCUMENTS

| | | | |
|---|---|---|---|
| 3,863,443 A * | 2/1975 | Chamberlain | F02K 9/972 60/265 |
| 4,109,460 A * | 8/1978 | Schmidt | F02K 9/64 239/127.1 |
| 4,428,191 A | 1/1984 | Lane et al. | |
| D273,579 S | 4/1984 | Martin et al. | |
| 4,471,609 A | 9/1984 | Porter et al. | |
| 5,127,602 A | 7/1992 | Batey et al. | |
| 5,282,359 A | 2/1994 | Chester | |
| 5,727,378 A | 3/1998 | Seymour | |
| 2005/0060982 A1 | 3/2005 | Mani et al. | |
| 2007/0245741 A1 | 10/2007 | Johnson et al. | |
| 2010/0008772 A1 | 1/2010 | Vauchel et al. | |
| 2010/0205933 A1 | 8/2010 | Mungas et al. | |
| 2013/0014515 A1 | 1/2013 | Bellabal et al. | |
| 2014/0161618 A1 | 6/2014 | Walker et al. | |
| 2014/0352797 A1 | 12/2014 | Aten et al. | |
| 2015/0377033 A1 | 12/2015 | Xu | |
| 2016/0040552 A1 | 2/2016 | Rahaim et al. | |
| 2016/0169516 A1 | 6/2016 | Low et al. | |
| 2016/0186689 A1 | 6/2016 | Bartel et al. | |
| 2017/0159490 A1 | 6/2017 | Sennoun | |
| 2018/0038278 A1 | 2/2018 | Taliercio et al. | |
| 2018/0073391 A1 | 3/2018 | Jennings | |
| 2018/0280851 A1 | 10/2018 | Klaus et al. | |
| 2020/0052570 A1 | 2/2020 | Holcomb | |

FOREIGN PATENT DOCUMENTS

| | | |
|---|---|---|
| JP | 2013019330 A | 1/2013 |
| WO | 2014196634 A1 | 12/2014 |
| WO | 2018115731 A1 | 6/2018 |

* cited by examiner

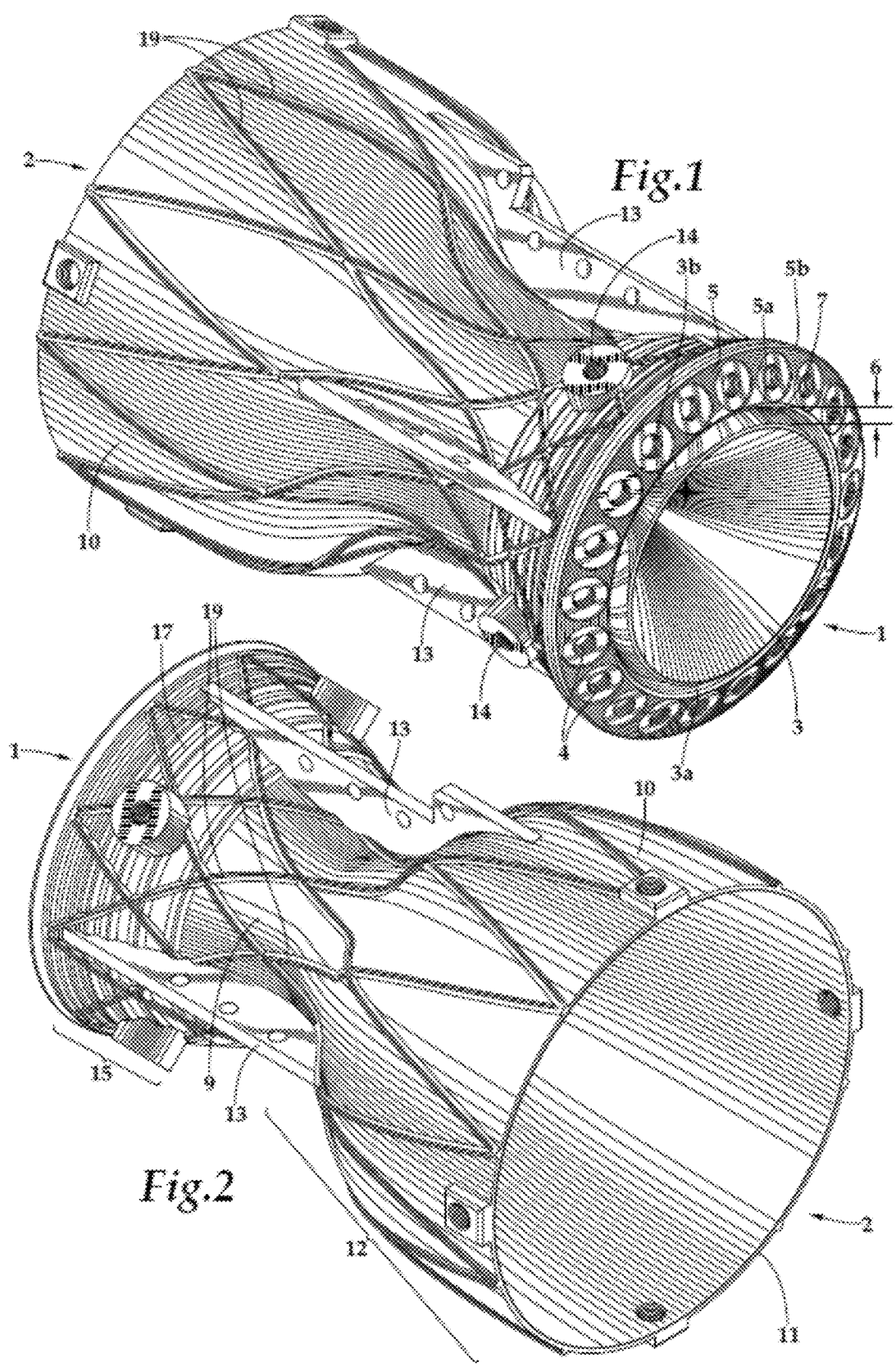

SECTION C-C

LIQUID-COOLED AIR-BREATHING ROCKET ENGINE

FIELD OF THE INVENTION

The present invention relates generally to the field of propulsion engines, and more particularly, to a rocket engine with no moving parts that intakes ambient fluid for use as free reaction mass and is capable of using oxidizer contained within the fluid for the combustion cycle.

BACKGROUND

There are two major differences between rocket engines and jet engines. The first is that rocket engines must carry not only all of their own fuel into space but also a source of oxygen to burn that fuel. Jet engines, on the other hand, carry fuel, but they use oxygen from the air to burn that fuel. The second major difference is that jet engines have an air intake and an exhaust opening, whereas rocket engines typically receive fuel and oxidizer via a closed manifold system and have only an exhaust opening. Both types of engines produce thrust through an internal pressure difference, and both eject exhaust gases in a direction that is opposite to that of the path of travel of the engine.

Current jet engine designs, including marine and aerospace jet engines, rely on moving parts such as impellers or compressors in order to function. These moving parts increase manufacturing and maintenance costs and present performance risk. For example, a fault in the turbine or compressor blades in an aerospace engine can result in catastrophic failure of the entire engine and loss of life. Some known examples of engine designs are set forth below.

U.S. Pat. No. 4,428,191 ("Lane") titled "Fuel Combustion in Ducted Flow" provides a combustion apparatus with a duct for containing a flow of air and an air-fuel mixing device having an assembly of transversely spaced longeron members extending along the duct. The longeron members are inclined to the general direction of flow through the duct and to the walls of the duct so that a major portion of the flow through the duct will pass through the spaces between the longeron members. The longitudinal edges of the longeron members are adapted to shed continuous vortices. A baffle extends across the upstream end of the longeron members and forms a sheltered pilot combustion zone. The engine in Lane further comprises means for generating pilot vortices of combustible mixture in the pilot zone, causing each pilot vortex to divide, and directing the divided portion of each pilot vortex to pass downstream along adjacent parts of adjacent longeron members.

U.S. Pat. No. 5,282,359 ("Chester") titled "Impulse Jet Engine" describes a jet engine with no moving parts and a toroidal combustion chamber. A toroidal exhaust port directs exhaust gases radially inward and toward the engine outlet. The exhaust gases induce a secondary air flow through the engine, and the entrained secondary air enters the engine inlet, thereby cooling and slowing the exhaust gases. In an alternate embodiment, the trailing end of the housing is frustoconical, and the exhaust port directs the exhaust gases to converge toward one another, thereby causing the entrained air to flow in a converging pattern. In both embodiments, the mass of the entrained, secondary air is large relative to the mass of the exhaust gases so that the secondary air flows through the engine at a relatively low velocity.

U.S. Pat. No. 5,727,378 ("Seymour") titled "Gas Turbine Engine" discloses a small, "air-breathing" gas turbine engine. The engine comprises a flame-free primary mixing zone in the combustion chamber, a primary combustion zone, a secondary combustion zone, and a dilution zone. A bearing assembly is located between a compressor and a turbine wheel. A cooling cavity is situated between the turbine wheel and the bearing assembly. The engine in Seymour also comprises a toroidally-shaped compressor discharge plenum, which is between the compressor and the turbine wheel. The toroidally-shaped compressor discharge plenum acts as an air accumulator, an air shock absorber, and an air stabilizer.

U.S. Patent Application Pub. No. 2018/0038278 ("Taliercio") titled "Constant-Volume Combustion System for a Turbine Engine of an Aircraft Engine" provides a combustion system for a turbine engine in which a plurality of combustion chambers is regularly distributed around a longitudinal axis. A toroidal manifold includes a radially oriented outlet for supplying compressor air to each combustion chamber. A toroidal exhaust pipe with a radially oriented inlet collects the combustion gases from the combustion chambers, which are radially positioned between the manifold outlet and the exhaust pipe inlet. The drawing in of the compressed air from the manifold outlet and the ejection of combustion gas toward the exhaust pipe are controlled by a timing device for each chamber.

SUMMARY

Introduced here is an engine that, in at least one embodiment, comprises a shell, an intake, a primary combustion chamber and a secondary combustion chamber. The intake is situated within the shell and is a channel via which to draw ambient fluid (such as, but not limited to, air) into the engine. The primary combustion chamber is situated within the shell and is used to combust a mixture of fuel and oxidizer. The secondary combustion chamber is situated within the shell and is in fluid communication with the intake. The secondary combustion chamber is used to combust a mixture of ambient fluid received via the intake and uncombusted mass expelled from the primary combustion chamber. The intake, the primary combustion chamber, and the secondary combustion chamber are collectively arranged so that, when the engine is in operation, ejection of mass from the primary combustion chamber into the secondary combustion chamber causes a pressure differential that causes ambient fluid to be drawn into the secondary combustion chamber via the intake.

In at least some embodiments, the shell, the intake, the primary combustion chamber and the secondary combustion chamber are all formed from a single piece of material. In at least some embodiments, when the engine is in operation, ambient fluid drawn into the secondary combustion chamber via the intake is used as reaction mass in the secondary combustion chamber; and, if the ambient fluid contains oxidizer, the oxidizer in the ambient fluid is used for combustion in the secondary combustion chamber.

In at least some embodiments, the primary combustion chamber is annular in shape and is disposed about a longitudinal axis of the engine. In at least some embodiments, the intake and the primary combustion chamber are situated within a front end of the engine relative to an intended direction of travel of the engine during operation of the engine on a vehicle. In at least some embodiments, the primary combustion chamber comprises an annular (e.g., toroidal) gap defined about the longitudinal central axis between an inner surface of a front end of the shell and an outer surface of the intake.

In at least some embodiments, the secondary combustion chamber comprises a throat area defined by a portion of an interior surface of the shell. In at least some embodiments, the intake is substantially conical in shape, and a front opening of the intake, relative to an intended direction of travel of the engine during operation of the engine on a vehicle, is wider than a rear opening of the intake.

In at least some embodiments, the engine further comprises an oxidizer port and a fuel port, each in fluid communication with the primary combustion chamber, via which to introduce oxidizer and fuel, respectively, into the primary combustion chamber. In at least some embodiments, the engine comprises a plurality of oxidizer ports and a plurality of fuel ports, each in fluid communication with the primary combustion chamber, via which to introduce oxidizer and fuel, respectively, into the primary combustion chamber, wherein the plurality of oxidizer ports and the plurality of fuel ports are disposed circumferentially about the longitudinal central axis.

The techniques introduced here further include a method of generating thrust. In at least some embodiments, the method comprises receiving fuel and oxidizer into an engine; and generating thrust by expelling reaction mass from the engine, by combusting the fuel and oxidizer received into the engine to create a pressure differential that causes ambient fluid to be drawn into the engine, and using the ambient fluid drawn into the engine by said pressure differential as at least one of: a) oxidizer for additional combustion, or b) reaction mass.

In at least one embodiment, the engine comprises: an outer shell, the outer shell being hourglass-shaped and having a front end, a throat area, and an exhaust, the throat area being situated between the front end and the exhaust, the throat area have a smaller inner diameter than the front end or the exhaust; a funnel-shaped intake situated at least partially inside of the front end of the outer shell and terminating in a floor; a circumferential front ledge forming a perimeter of the front end of the outer shell, the circumferential front ledge comprising one or more injector ports; and at least one ignition port situated on an outside of the outer shell on the front end of the outer shell between the circumferential front ledge and the throat area; wherein the circumferential front ledge comprises an inner edge and an outer edge; wherein an inner front wall extends from the inner edge of the circumferential front ledge to the floor; wherein the intake comprises an outer wall that forms a skirt over the floor; wherein the outer wall of the intake, the inner front wall, and the skirt are configured to form a first circumferential gap between the intake and the inner front wall, the first circumferential gap not being in fluid communication with the throat or the exhaust; wherein the first circumferential gap has an inner diameter, and the inner diameter of the first circumferential gap widens from a front end of the first circumferential gap to the skirt; wherein the inner front wall comprises an outer surface, wherein the outer shell comprises an inner surface, and wherein the outer surface of the front inner wall and the inner surface of the front end of the outer shell are configured to form a second circumferential gap, the second circumferential gap being in fluid communication with the at least one injector port and the at least one ignition port; wherein the second circumferential gap has an inner diameter, and the inner diameter of the second circumferential gap decreases at a terminal end of the second circumferential gap, the terminal end of the second circumferential gap being aligned laterally with the floor; wherein the second circumferential gap is in fluid communication with the throat and exhaust; wherein the intake has an inner diameter that decreases from a front edge of the intake to a point forward of the floor and increases from said point to the floor; wherein the intake comprises a central aperture that extends from the front edge of the intake to the floor and is in fluid communication with the throat area and exhaust; wherein the throat area comprises a front end, and the terminal end of the second circumferential gap is situated at the front end of the throat area; wherein the throat area is in fluid communication with the exhaust; and wherein the central aperture of the intake terminates at the front end of the throat area.

In at least one embodiment, the outer shell comprises an outer surface, and the outer surface of the outer shell comprises a plurality of crisscrossed ridges. In at least one other embodiment, the inner front wall comprises an inner surface, and the inner surface of the inner front wall comprises a plurality of circumferential ridges. In one embodiment, a front end of the first circumferential gap is open to the atmosphere.

In at least one embodiment, the outer edge of the circumferential front ledge has a diameter, the outer shell comprises a rear edge, the rear edge is circular in shape, the rear edge has an outer diameter, and the outer diameter of the rear edge of the outer shell is greater than the diameter of the outer edge of the front circumferential ledge. In at least one other embodiment, the floor has a perimeter, and the perimeter of the floor or bulbous in shape with a rounded circumferential outer edge. In yet another embodiment, the floor is angled upward toward the central aperture of the intake.

In at least one embodiment, the floor has a width, the central aperture has a width, and the front edge of the intake has a width; and the width of the floor is greater than the width of the central aperture but less than the width of the front edge of the intake. In at least one other embodiment, the throat area comprises a center part with an inner diameter, the rear edge of the outer shell has an inner diameter, and the inner diameter of the center part of the throat area is approximately 0.5 times the inner diameter of the rear edge of the outer shell. In yet another embodiment, the inner diameter of the second circumferential gap is constant except at the terminal end, and the inner diameter of the second circumferential gap at the terminal end is approximately 0.38 times the inner diameter of the second circumferential gap other than at the terminal end.

BRIEF DESCRIPTION OF THE DRAWINGS

One or more embodiments of the present disclosure are illustrated by way of example and not limitation in the figures of the accompanying drawings, in which like references indicate similar elements.

FIG. 1 is a front perspective view of the engine introduced here, according to a first embodiment.

FIG. 2 is a rear perspective view of the engine according to the first embodiment.

DETAILED DESCRIPTION

Figure 3:
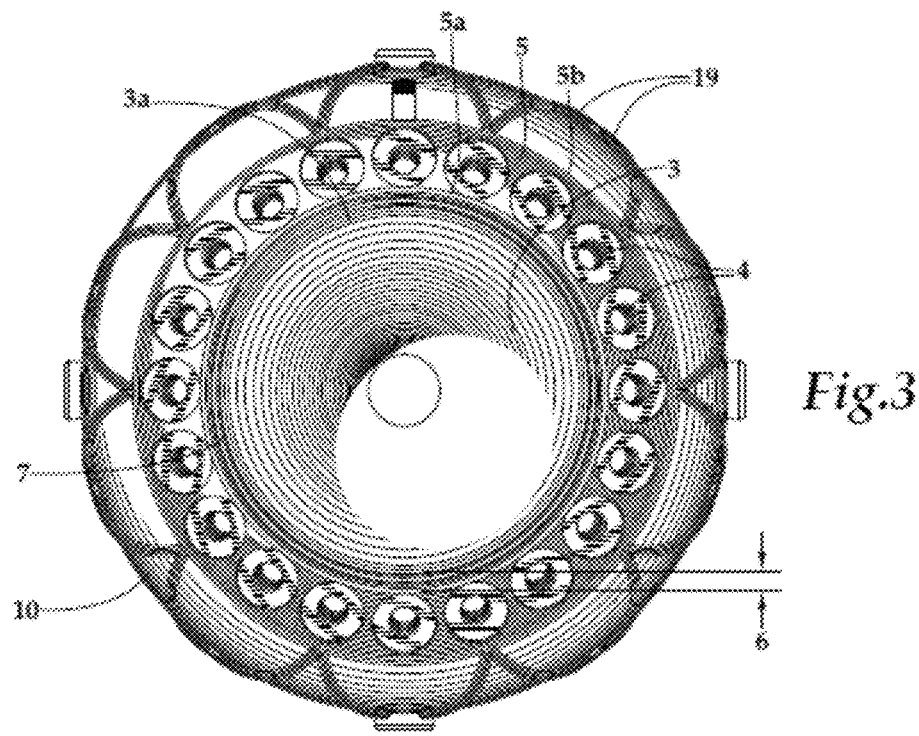
FIG. 3 is a front view of the engine according to the first embodiment.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here is an engine that is neither a conventional rocket engine nor a conventional jet engine, because the vehicle on which it is mounted carries both fuel and oxidizer but requires less oxidizer than would be required for a conventional rocket engine. The engine can be formed from a single piece of material and therefore requires no maintenance beyond verifying structural integrity of the engine body and fuel systems. Note that wherever references are made herein to "ambient air," other fluids may be substituted for the ambient air. The term "ambient fluid" includes, but is not limited to, ambient air.

First Embodiment

FIG. 1 is a front perspective view of an engine in accordance with a first embodiment. As shown in all of the figures, the engine can be a single piece of material with no moving parts. This characteristic, in and of itself, distinguishes the engine from other engines used in aviation or space applications. In at least one embodiment, the material is an INCONEL® nickel-chromium alloy or any other refractory superalloy. Referring to FIGS. 1 and 2, the engine has a front end (forward end) 1 and a rear end (aft end) 2. The front end 1 is the end that is frontward relative to the intended direction of travel of a vehicle on which the engine is mounted. The rear end 2 is the end that is aftward relative to the intended direction of travel of a vehicle on which the engine is mounted. The front end 1 of the engine comprises a funnel-shaped intake 3 and a plurality of fuel and oxidizer injector ports 4. The funnel-shaped intake faces forward so that the widest part of the intake forms a mouth at the front end 1 of the engine.

The plurality of fuel and oxidizer injector ports 4 are disposed radially around a perimeter of the front end of the engine and surround the front edge 3a of the intake 3 (with a gap 6 between the circumferential front ledge 5 and the front edge 3a of the intake 3). The plurality of fuel and oxidizer injector ports 4 are situated on a circumferential front ledge 5 that forms the perimeter of the front end 1 of the engine. The circumferential front ledge 5 is angled downward so that the inner edge 5a of the circumferential front ledge 5 is slightly closer to the front end 1 of the engine than the outer edge 5b of the circumferential front ledge 5. Thus, the fuel and oxidizer injector ports are at about a forty-five-degree (45°) angle relative to a longitudinal central axis (which is parallel to the thrust vector)) of the engine or about a one hundred thirty-five-degree (135°) angle relative to a lateral axis of the engine (see FIG. 5). The front edge 3a of the intake 3 extends forwardly of the inner edge 5a of the circumferential front ledge 5 so that the front edge 3a of the intake 3 is the forward-most part of the engine (see FIG. 5). In the illustrated embodiment, the front edge 3a of the intake 3, the inner edge 5a of the circumferential front ledge 5, and the outer edge of the circumferential front ledge 5 are all circular in shape.

As noted above, there is a first circumferential gap 6 between the front edge 3a of the intake 3 and the inner edge 5a of the circumferential front ledge 5. This first circumferential gap 6 lies between the outer wall 3b of the intake 3 and an inside surface of an inner front wall 7 that is situated directly underneath (rearward) of the inner edge 5a of the circumferential front ledge 5 and within the outer shell 10. In one embodiment (not shown), the front end of the first circumferential gap 6 is sealed and circulates fuel before it is combusted in order to provide conductive cooling to the combustion chamber and pre-heat fuel. In another embodiment, the front end of the first circumferential gap 6 is open to the ambient air to provide cooling.

Figure 6:
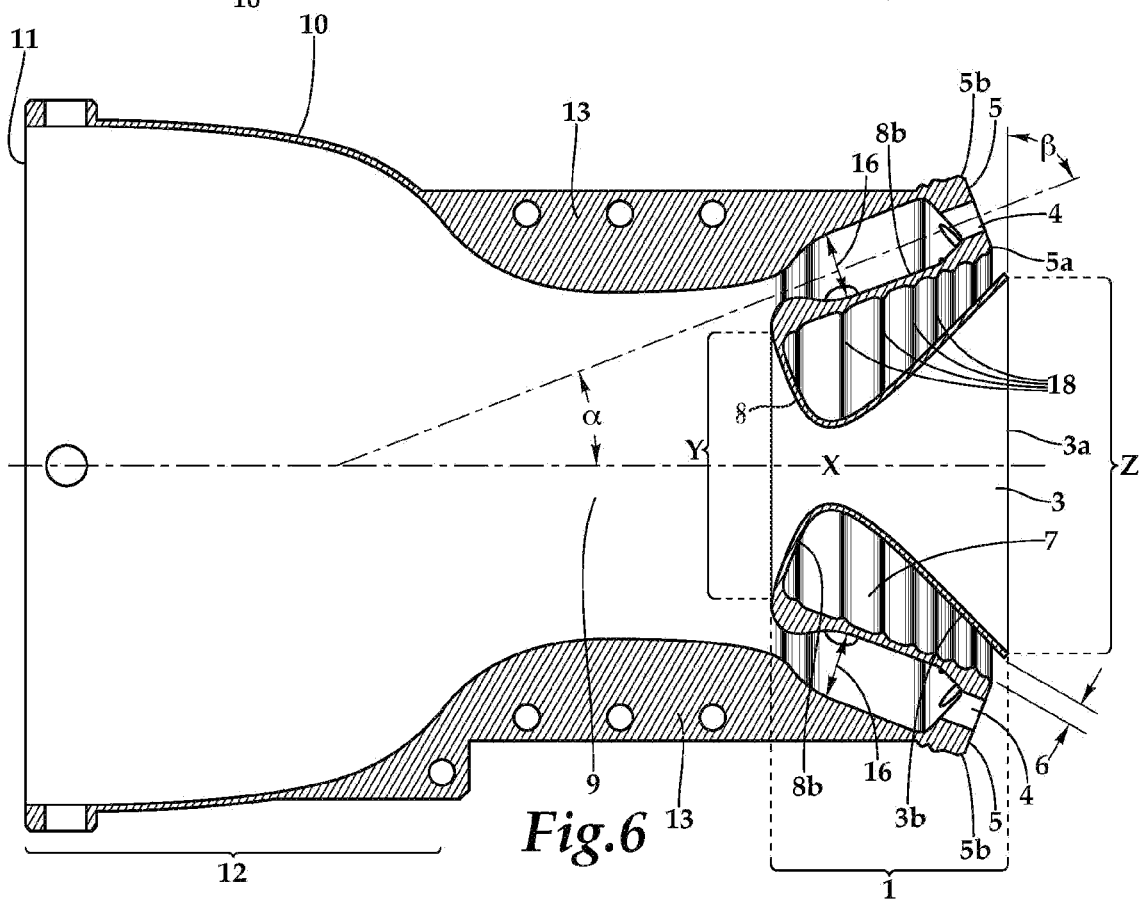
FIG. 6 is a cross-sectional view of the engine according to the first embodiment, corresponding to the side view in FIG. 5.

The outer wall 3b of the intake 3 and the inner front wall 7 are spaced apart from one another for a certain distance and joined together at a skirt 8b (see FIG. 6). The inner front wall 7 is tapered inward (toward the center of the engine) at a relatively constant angle equal to approximately forty-five degrees (45°) relative to the longitudinal central axis of the engine, whereas the funnel-shaped intake 3 tapers inward much more drastically than the inner front wall 7; therefore, the distance between the outer wall 3b of the intake 3 and the inner front wall 7 (that is, the size of the first circumferential gap 6) increases from the front end of the first circumferential gap 6 to the skirt 8b. The floor 8 is situated inside of the engine (that is, inside of the outer shell 10) just forward of the throat area 9 (see FIG. 6) and within the front end 1 of the engine (see FIG. 6). The floor 8 is inside of the skirt 8*b*.

The engine further comprises an outer shell 10 that extends from the outer edge 5*b* of the circumferential front ledge 5 to the rear edge 11 of the engine. The rear edge 11 is circular in shape and larger in diameter than the outer edge 5*b* of the circumferential front ledge 5. The outer shell 10 is shaped like an hourglass; it tapers inward from the outer edge 5*b* of the circumferential front ledge 5 to the throat area 9 (or waist) of the engine and then expands outward to the exhaust 12. Mounting brackets 13 span the outer shell 10 (in a longitudinal direction) at the throat area 9 and front end 15, as shown. Two pairs of opposing ignition ports 14 are situated on the front end 15 of the outer shell 10 beneath (or rearward of) the circumferential front ledge 5. The fuel and oxidizer injector ports 4 and the ignition ports 14 are threaded and configured to accept, respectively, fuel and/or oxidizer hoses and spark plugs. In at least one embodiment, there is one ignition port 14 for every five injector ports 4. The thickness of the outer shell 10, outer wall 36 of the intake 3, and inner front wall 7 may be optimized (that is, mass may be added or decreased in certain areas) depending on modular and tensile strength requirements and localized thermal requirements.

Figure 4:
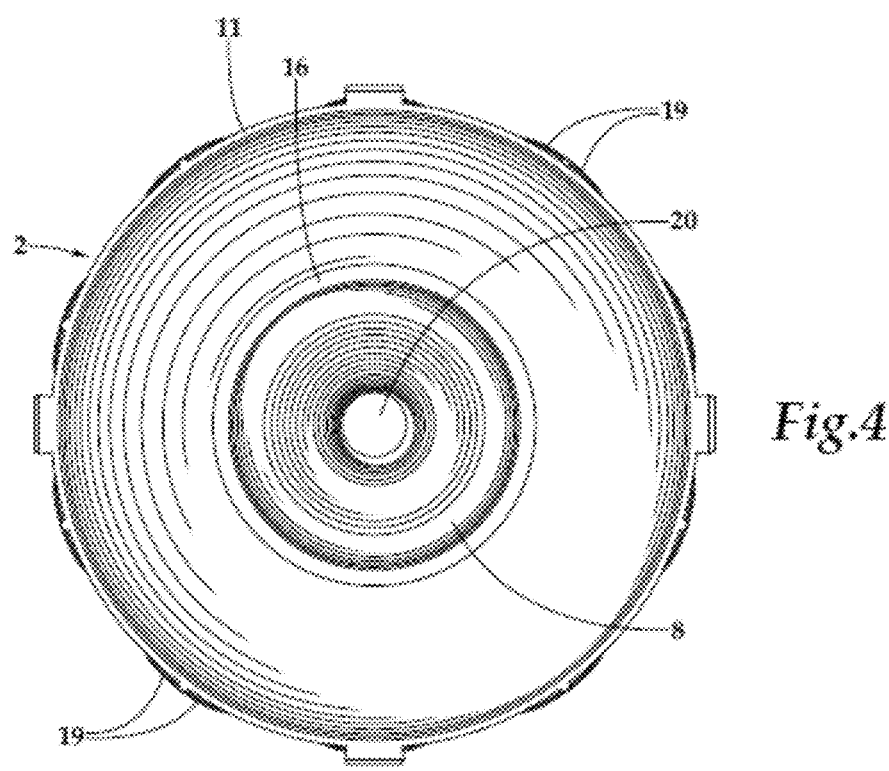
FIG. 4 is a rear view of the engine according to the first embodiment.

There is a second circumferential gap 16 between the outside surface of the inner front wall 7 and the outer shell 10 (see FIG. 4). This second circumferential gap 16 is in fluid communication with (that is, open to) the throat area 9 and exhaust 12, whereas the first circumferential gap 6 is not. The circumferential front ledge 5 encloses the front end of the second circumferential gap 16, and the fuel and oxidizer injector ports 4 are configured to enable the injection of fuel and/or oxidizer into the second circumferential gap 16. In at least one embodiment, the outside surface of the front end 15 of the outer shell 10 comprises a plurality of circumferential ridges 17 (also referred to as "hat banding" or "strengthening hoops"); these ridges contribute to the structural integrity of the engine. The inside surface of the inner front wall 7 (that is, that side of the inner front wall 7 that faces the funnel-shaped intake 3) also comprises a plurality of circumferential ridges 18 for the same reason.

Figure 5:
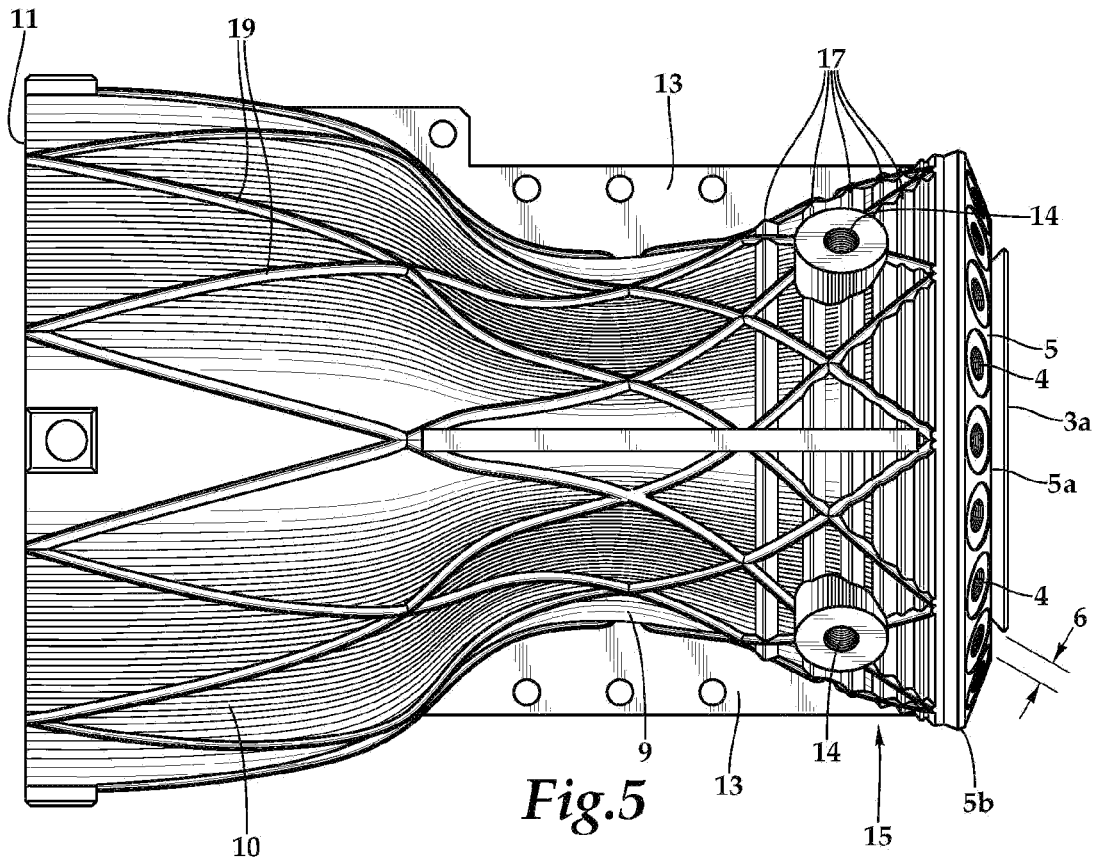
FIG. 5 is a side view of the engine according to the first embodiment.

FIGS. 3 and 4 are front and rear views, respectively, of the engine. FIG. 5 is a side view of the engine. As shown in the latter figure, as well as FIGS. 1 and 2, the outer shell comprises a crisscrossed pattern of external ridges 19 extending from the outer edge 5*b* of the circumferential front ledge 5 to the rear edge 11 of the engine. These external ridges 19 impart additional structural integrity to the engine. They overlie the circumferential ridges 17 on the front end 15 of the outer shell 10.

FIG. 6 is a cross-sectional view, corresponding to the side view of FIG. 5, taken at a vertical plane through the longitudinal central axis of the engine. Note that the intake 3 tapers to a point ("X" on FIG. 6) and then expands outward toward the floor 8 (the outward expansion of the outer wall 3*b* of the intake 3 forms the skirt 8*b*). In at least one embodiment, the width of the floor ("Y" on FIG. 6) is greater than "X" (which is the width of the central aperture 20) but less than the width of the intake 3 at the front edge 3*a* (depicted as "Z" on FIG. 6). In at least one embodiment, the floor 8 is not flat but rather angled upwards toward the central aperture 20.

Figure 7:
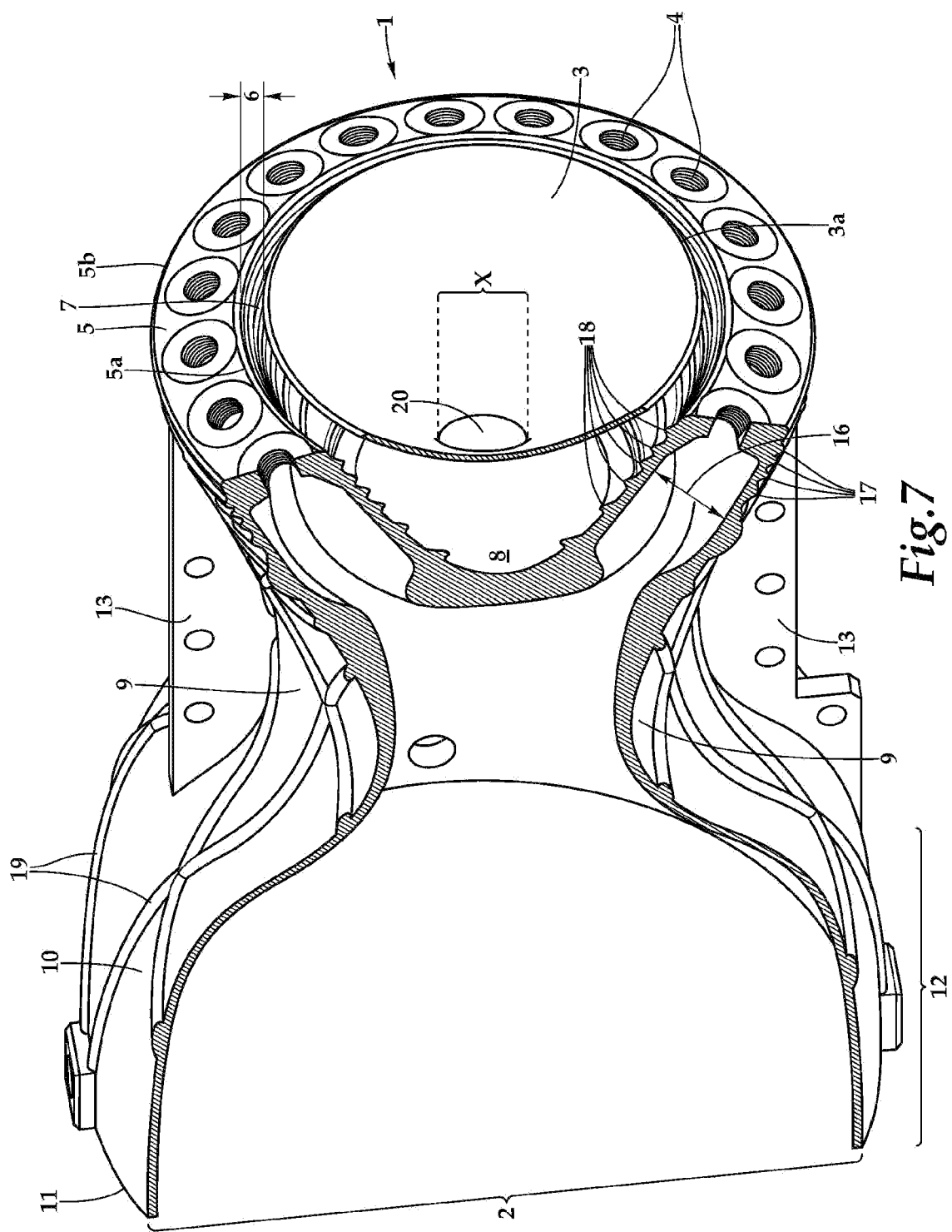
FIG. 7 is a front cutaway perspective view of the engine according to the first embodiment.

FIG. 7 is a front cutaway perspective view of the engine. This figure shows the tapering of the intake 3 (from front to rear) to point "X" and then the broadening of the intake 3 (again, from front to rear) to form the floor 8. Note that the central aperture 20 of the intake 3 (formed by the taper point "X") is in fluid communication with (that is, open to) the throat 9 and exhaust 12 portions of the engine (see also FIGS. 4 and 6).

Figure 8:
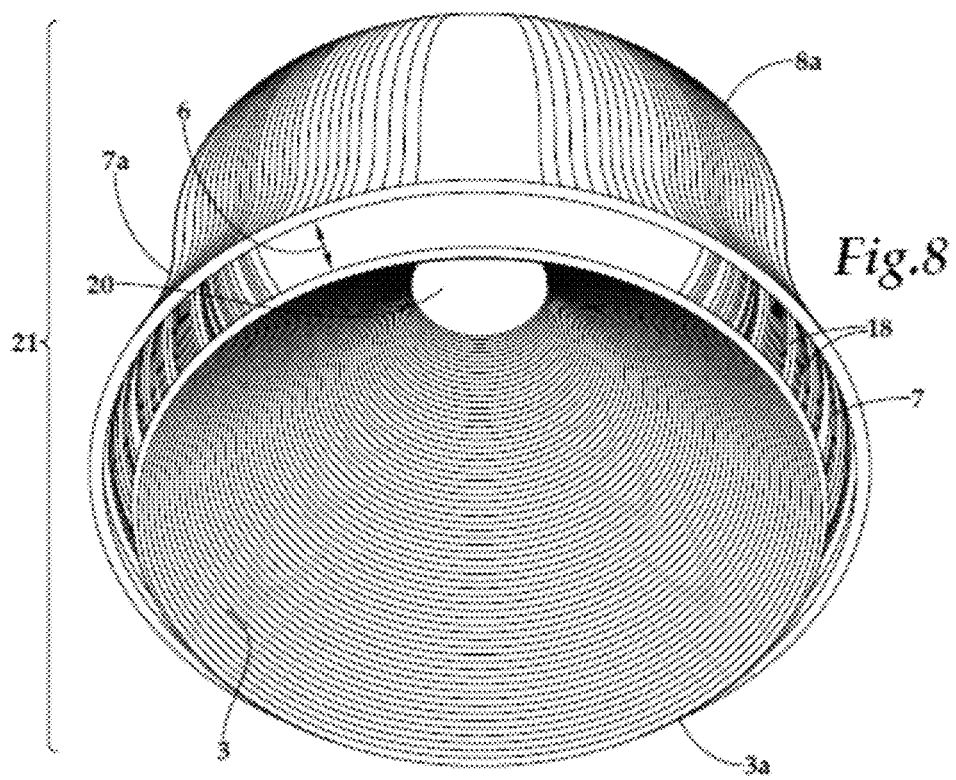
FIG. 8 is a front perspective view of the interior portion of the engine according to the first embodiment.
Figure 9:
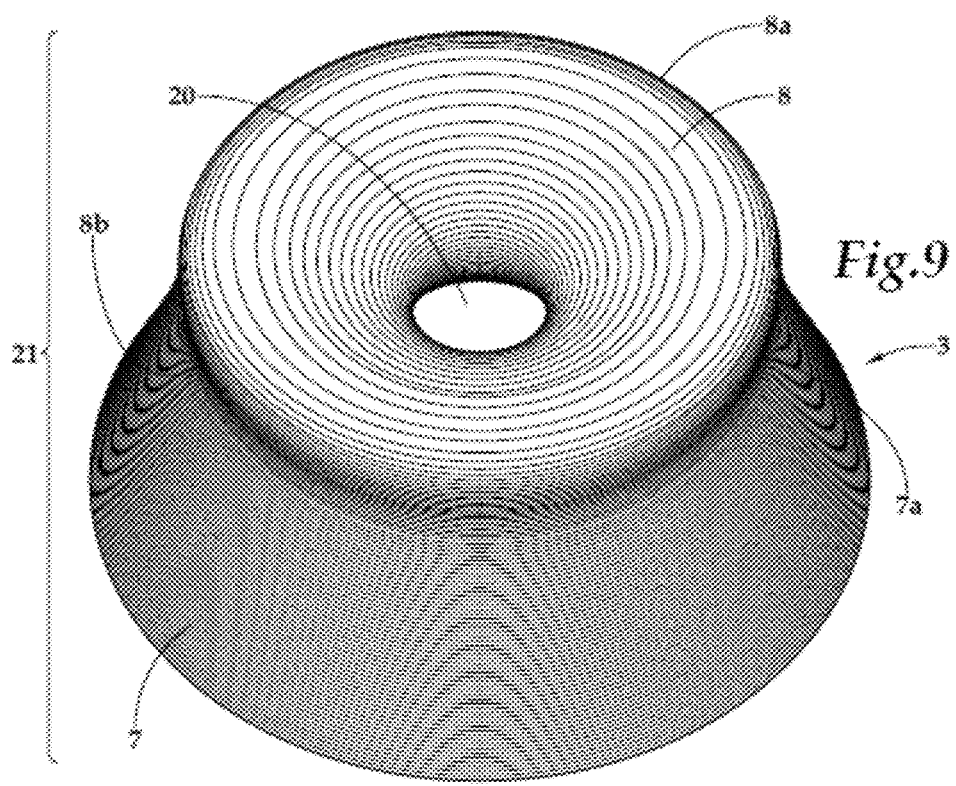
FIG. 9 is a rear perspective view of the interior portion of the engine according to the first embodiment.

FIG. 8 is a front perspective view of the interior portion of the engine, and FIG. 9 is a rear perspective view of the interior portion of the engine. In these two figures, the outer shell 10 and circumferential ledge 5 (with the fuel and oxidizer ports 4) have been removed to better illustrate the interior portion of the engine. The interior portion 21 of the engine comprises the intake 3, inner front wall 7 and floor 8 (the outer wall 3*b* of the intake and the inner front wall 7 being joined at the skirt 8*b*, as explained above). Although the first circumferential gap 6 is shown, the second circumferential gap 16 is not shown because the outer shell 10 has been removed.

Note that the perimeter of the floor 8 is bulbous in shape with a rounded circumferential outer edge 8*a*. The inner front wall 7 tapers inward at its center 7*a* (see also FIG. 6). That part of the second circumferential gap 16 that lies between the center 7*a* of the inner front wall 7 and the outer shell 10 forms an annular (e.g., toroidal) combustion chamber. As noted above, the floor 8 demarcates the rear of the front end 1 and the front of the throat area 9 of the engine (see FIG. 6); thus, the entire interior portion 21 of the engine is situated within the front end 1 of the engine.

Figure 10:
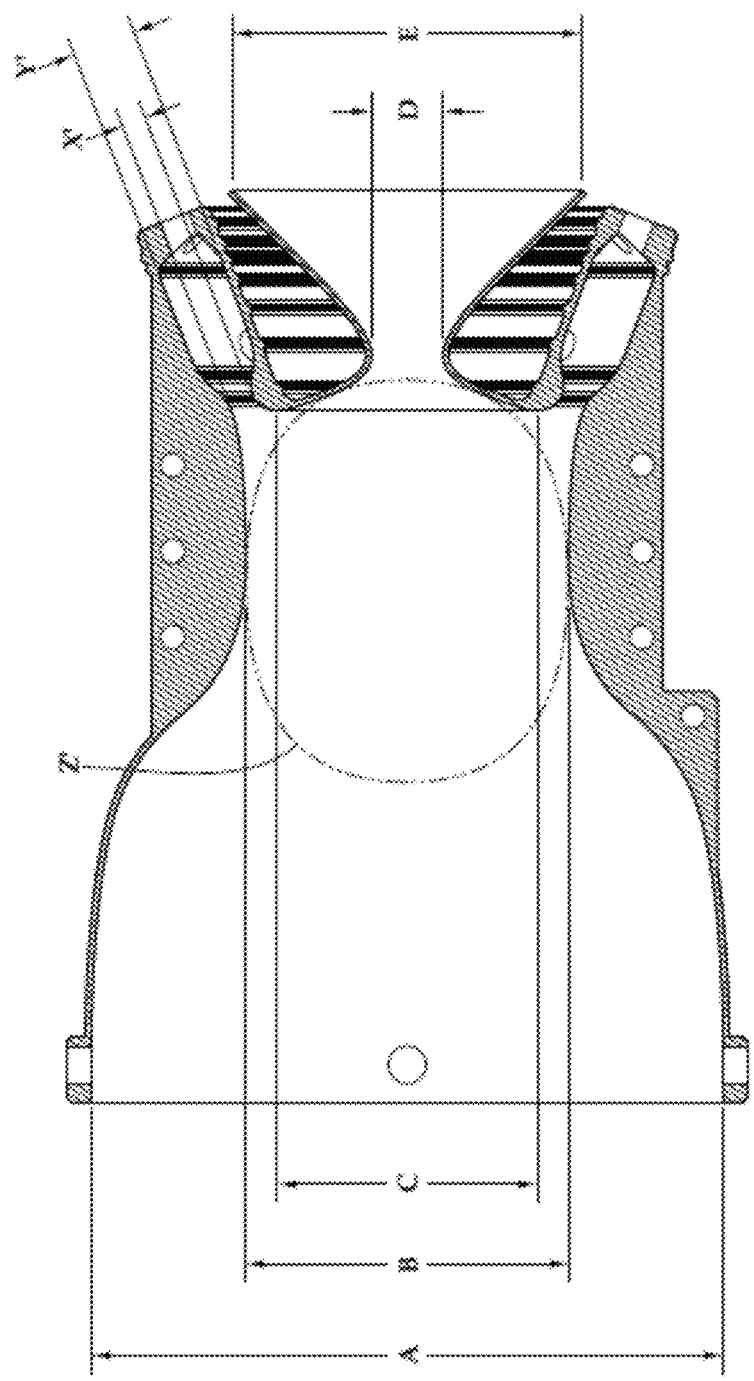
FIG. 10 is a cross-sectional view of the engine corresponding to the side view in FIG. 5 and including dimensional annotations according to the first embodiment.

FIG. 10 is the same view as shown in FIG. 6, but with added annotations regarding certain dimensional features of the engine. Dimension A is the inside diameter of the exhaust 12 at the rear edge 11. Dimension B is the inner diameter of the engine at the center part of the throat area 9. Dimension C is the distance between the two rear-most points of the floor 8 of the intake 3 (also denoted as Y on FIG. 6). Dimension D is the inner diameter of the intake 3 at the choke point denoted as X on FIG. 6. Dimension E is the inner diameter of the intake 3 at the front edge 3*a* denoted as Z on FIG. 6. Dimension X' is the inner diameter of the second circumferential gap 16 at the point at which fluid exiting the gap 16 enters the throat area 9. Dimension Y' is the inner diameter of the second circumferential gap 16 at its center (and along most of the length of the gap 16 until it tapers to dimension X'). It can be seen that the second circumferential gap 16 becomes narrower toward its aft end, and then widens again into the throat area 9. This geometry is referred to herein as a "convergent/divergent" interface.

In at least one embodiment, with reference to the dimensions shown in FIG. 10, dimension B is approximately one-half (0.5) of dimension A. Dimension C is approximately 0.4 of dimension A and approximately 0.8 of dimension B.

Dimension D is approximately 0.1 of dimension A, 0.2 of dimension B, and 0.25 of dimension C. Dimension E is preferably five times (5.0) that of dimension D. In at least one embodiment, the ratio of X' to Y' is 0.38. The aforementioned dimensions have been optimized to provide maximum fuel efficiency and thrust.

As will be apparent to those skilled in the art of fluid dynamics, the present invent ion is designed to take advantage of Bernoulli's principle, namely, that an increase in the velocity of a stream of fluid results in a decrease in pressure. This principle is applied in the context of the present disclosure at both dimension X' and dimension C. These are two places within the structure of the engine where fluids are compressed and then released into an area of greater volume, thereby creating a Venturi effect. Two vacuums are created in the engine disclosed herein—one where the toroidal combustion chamber 16 expels fluid into the throat area 9 and another where the intake 3 expels fluid into the throat area 9. The engine is designed so that both of these vacuums occur at the front end of the throat area and are aligned with each other laterally (see FIG. 6). Outside air is also partially drawn in according to the principles of the Bernoulli effect, which completes mixing of the non-combusted fuel passed to this area from the primary combustion chamber.

In operation, fuel and oxidizer are injected into the toroidal combustion chamber (i.e., the second circumferential gap 16), squeezed at dimension X', and then expelled from the toroidal combustion chamber at a relatively high velocity into the throat area 9, which functions as a secondary combustion chamber. The fluid is at its highest velocity (and lowest pressure) at this point, thereby creating a vacuum that draws ambient fluid in through the center of the intake 3 and into the throat area 9, where the ambient fluid mixes with a fuel-rich, high-speed combustion stream. The fluid temperature is at its highest inside the toroidal combustion chamber, where initial combustion takes place, and the flame from the toroidal combustion chamber 16 extends into the throat area 9 and through the center of the exhaust 12. The ambient air, which is at a relatively cooler temperature, enters through the intake 3 and mixes with the hot air in the throat area 9 to complete combustion of the fuel-enriched combustion stream from initial combustion.

Combustion occurs both in the toroidal combustion chamber (the second circumferential gap 16, which is the primary combustion chamber), where the fuel from the injector ports 4 is oxidized, and in the throat area 9 (the secondary combustion chamber) where the ambient air from the intake 3 mixes with the hot gasses from the toroidal combustion chamber. It is in the secondary combustion chamber that the ambient fluid is used as reaction mass. If the ambient fluid contains oxidizer, it is then used to complete combustion; if it does not, it simply acts as free reaction mass. The secondary combustion chamber is denoted as Z' in FIG. 10. Because the engine uses ambient fluid as reaction mass, a rocket vehicle equipped with the engine introduced herein would be required to carry less oxidizer than a conventional rocket vehicle. Put simply, a conventional rocket vehicle carries all of the required fuel and oxidizer, whereas a conventional jet vehicle carries all of the required fuel and no oxidizer (it uses ambient air as the oxidizer). The engine introduced here is neither a conventional rocket engine nor a conventional jet engine, because the vehicle on which it is mounted carries both fuel and oxidizer but requires less oxidizer than a conventional rocket engine. It should be noted that wherever references are made herein to "ambient air," other fluid s may be substituted for the ambient air. The term "ambient fluid" includes, but is not limited to, ambient air.

It can be seen that the intake 3, the toroidal combustion chamber (circumferential gap 16, also called primary combustion chamber) and the throat area 9 (also called secondary combustion chamber), due to their shapes and relative sizes and positioning, collectively form a "thrust generation means" for generating thrust, by expulsion of reaction mass from the shell, without the use of any moving parts within the engine, by combusting the fuel and oxidizer received into the engine to create a pressure differential that causes ambient fluid to be drawn into the engine and used within the engine as at least one of: a) oxidizer for additional combustion, or b) reaction mass.

Second Embodiment

FIGS. 11A through 24 illustrate a second embodiment of an engine in accordance with the teachings introduced here. Like the first embodiment, the second embodiment also includes a central ambient fluid intake 43 disposed along a central (longitudinal) axis of the engine, in fluid communication with the throat and exhaust areas 52 within the outer shell. Also, like the first embodiment, the second embodiment includes an annular primary combustion chamber 46 surrounding the ambient fluid intake, and a convergent/divergent interface between the annular primary combustion chamber and a secondary combustion chamber (throat area) 58.

Figure 14:
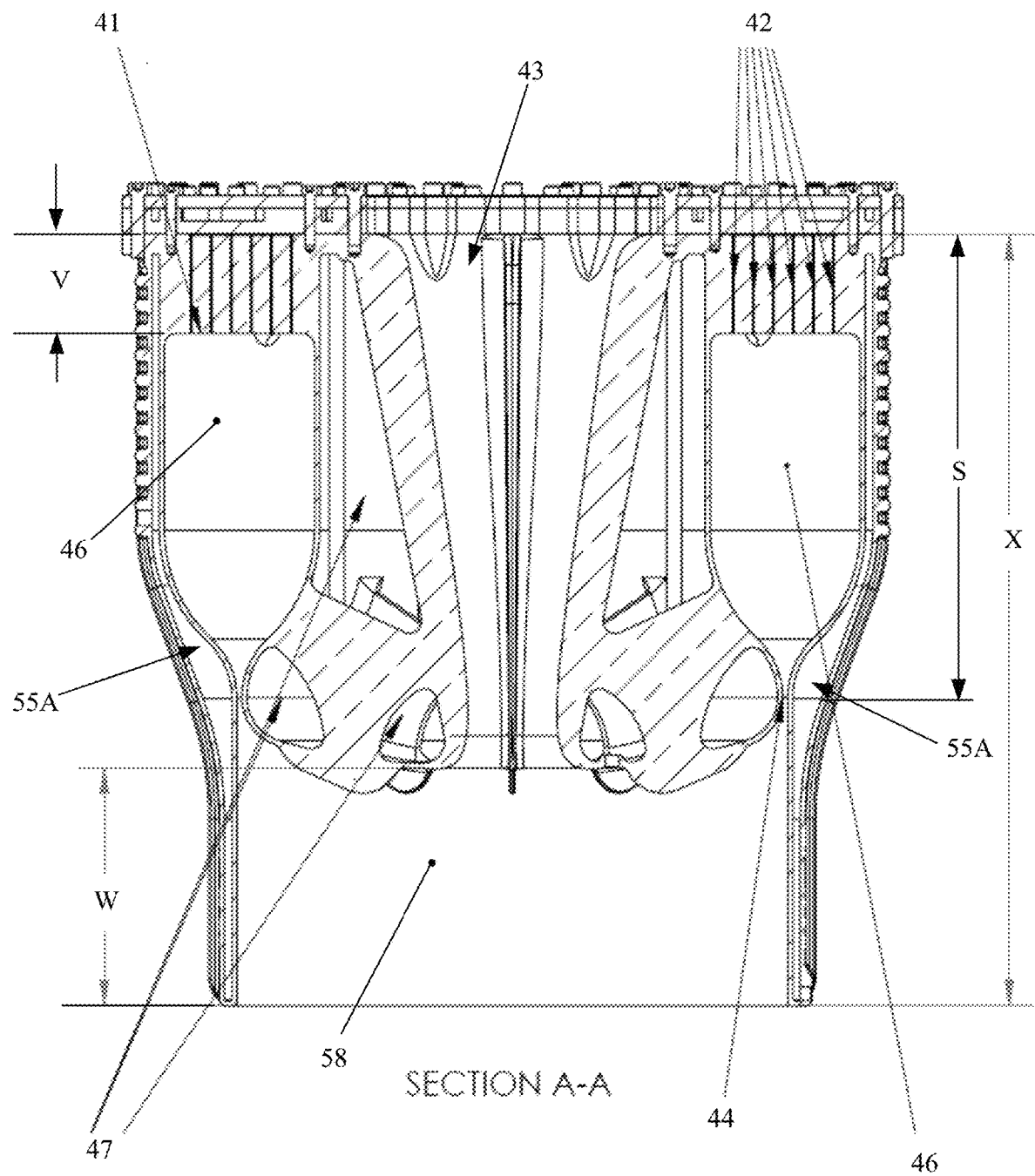
FIG. 14 is a cross-sectional view of the engine according to the second embodiment, corresponding to section line A-A in FIG. 13.
Figure 15:
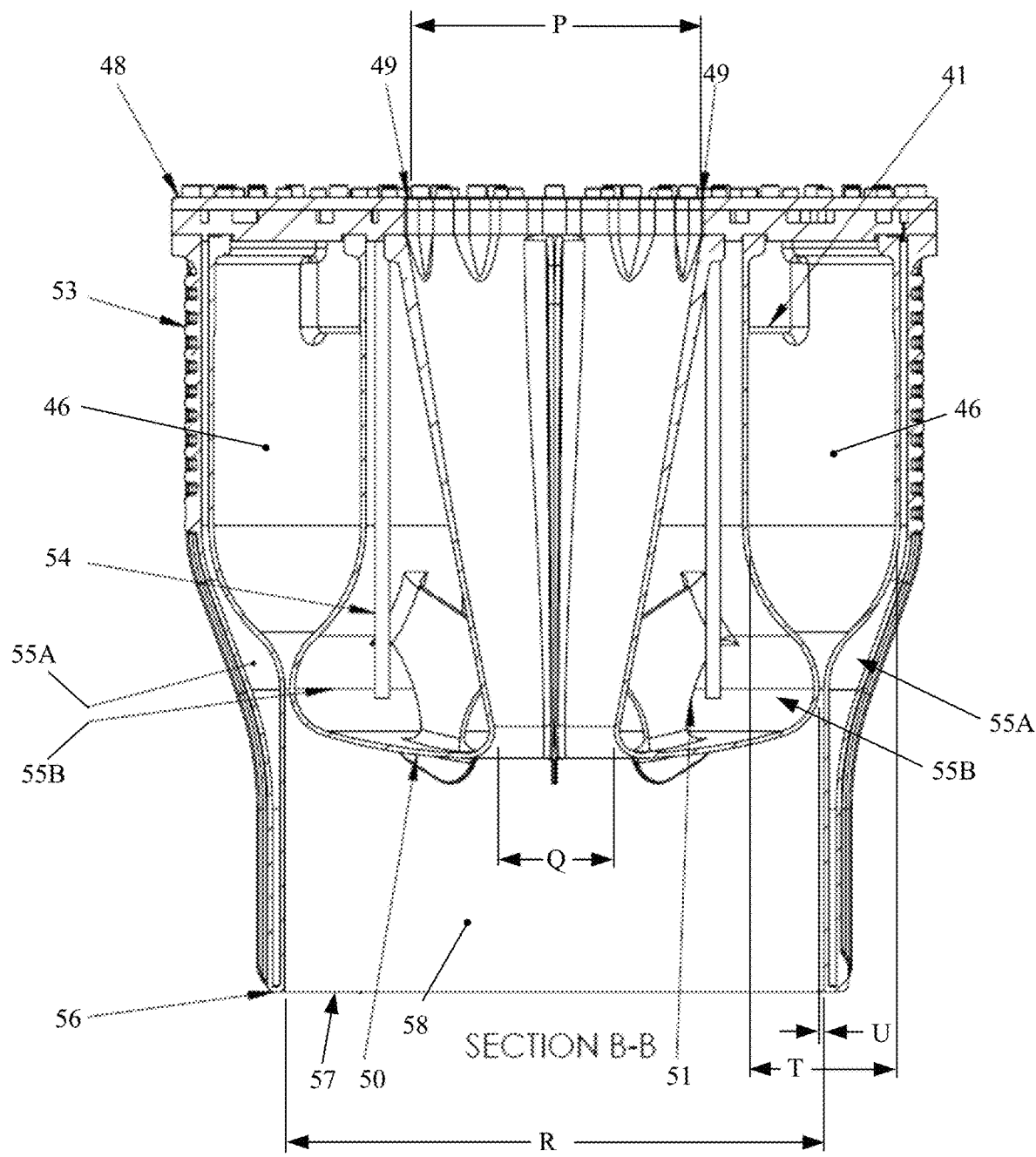
FIG. 15 is a cross-sectional view of the engine according to the second embodiment, corresponding to section line B-B in FIG. 13.

However, there are at least two notable differences between the second embodiment and the first embodiment. First, the second embodiment has a greater degree of convergence/divergence than the first embodiment, at the interface between the primary combustion chamber 46 and secondary combustion chambers 58 (FIGS. 14 and 15). Second, the second embodiment is designed to allow fluid propellant to cool the outer surfaces of annular primary combustion chamber. As used herein, the term "propellant" refers to either fuel or oxidizer. More particularly, fluid ingress/egress ports and conduits enable liquid oxidizer (such as liquid oxygen) or rocket propellant (such as RP-1) to be circulated through cavities surrounding the annular primary combustion chamber to provide cooling of the walls of the annular combustion chamber and pre-heating of the RP. Additionally, in at least some implementations the second embodiment may include a variable-geometry exhaust extension (so-called "turkey feathers") to allow thrust optimization by varying the circumference of the exhaust region of the engine. Other features will be apparent from the description which follows.

Figure 11A:
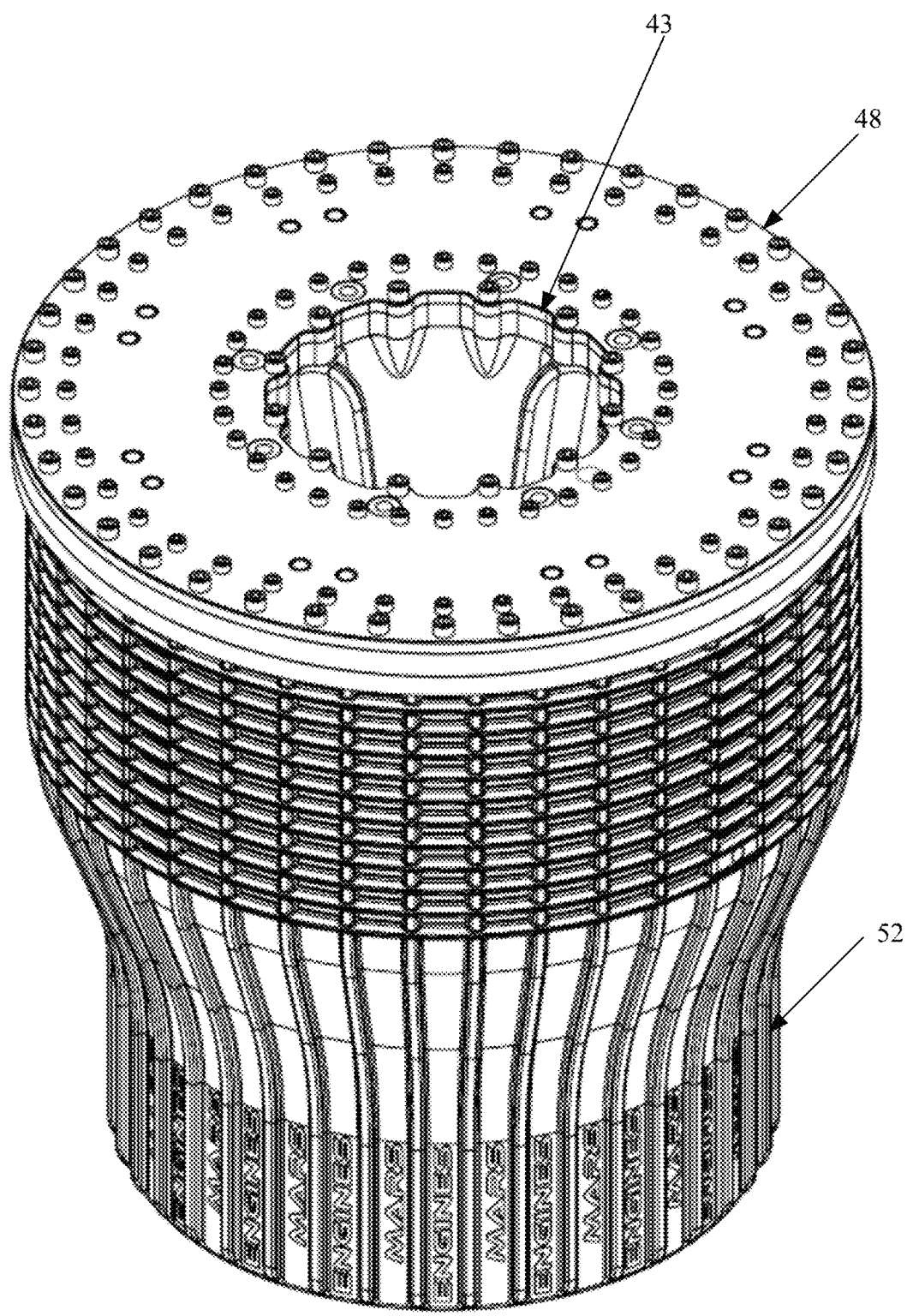
FIG. 11A is a perspective view of the engine according to a second embodiment, showing the front end of the engine.
Figure 12:
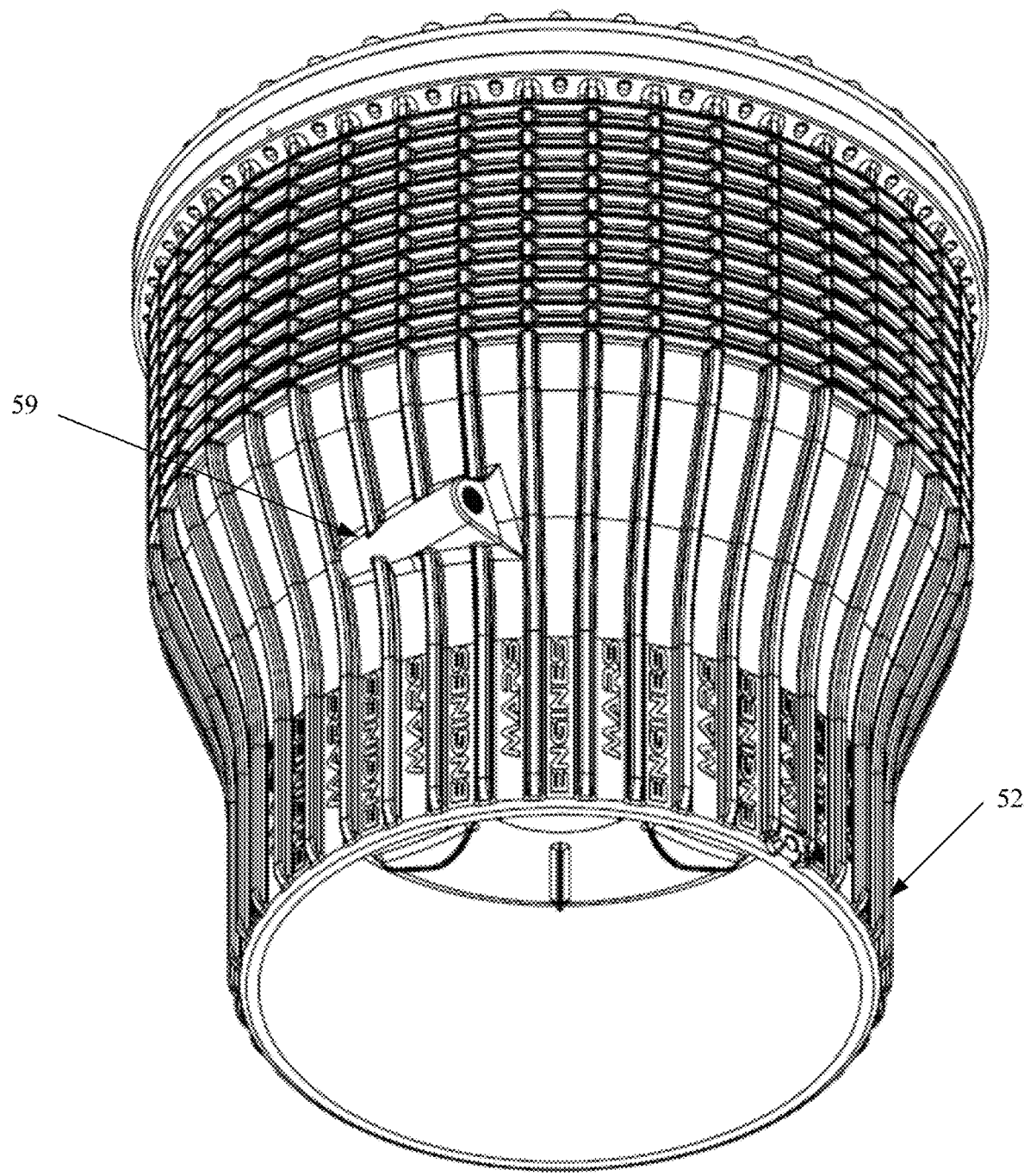
FIG. 12 is a perspective view of the engine according to the second embodiment, showing the aft end of the engine.

FIG. 11A is a perspective view showing the front end of the engine of the second embodiment, including the ambient fluid intake 43, fuel injector ports and oxidizer injector ports. FIG. 12 is a perspective view showing the aft end of the engine, including the exhaust portion 52 of the outer shell. As with the first embodiment, described above, the engine of the second embodiment can be formed as a single-piece part or from multiple parts.

Figure 11B:
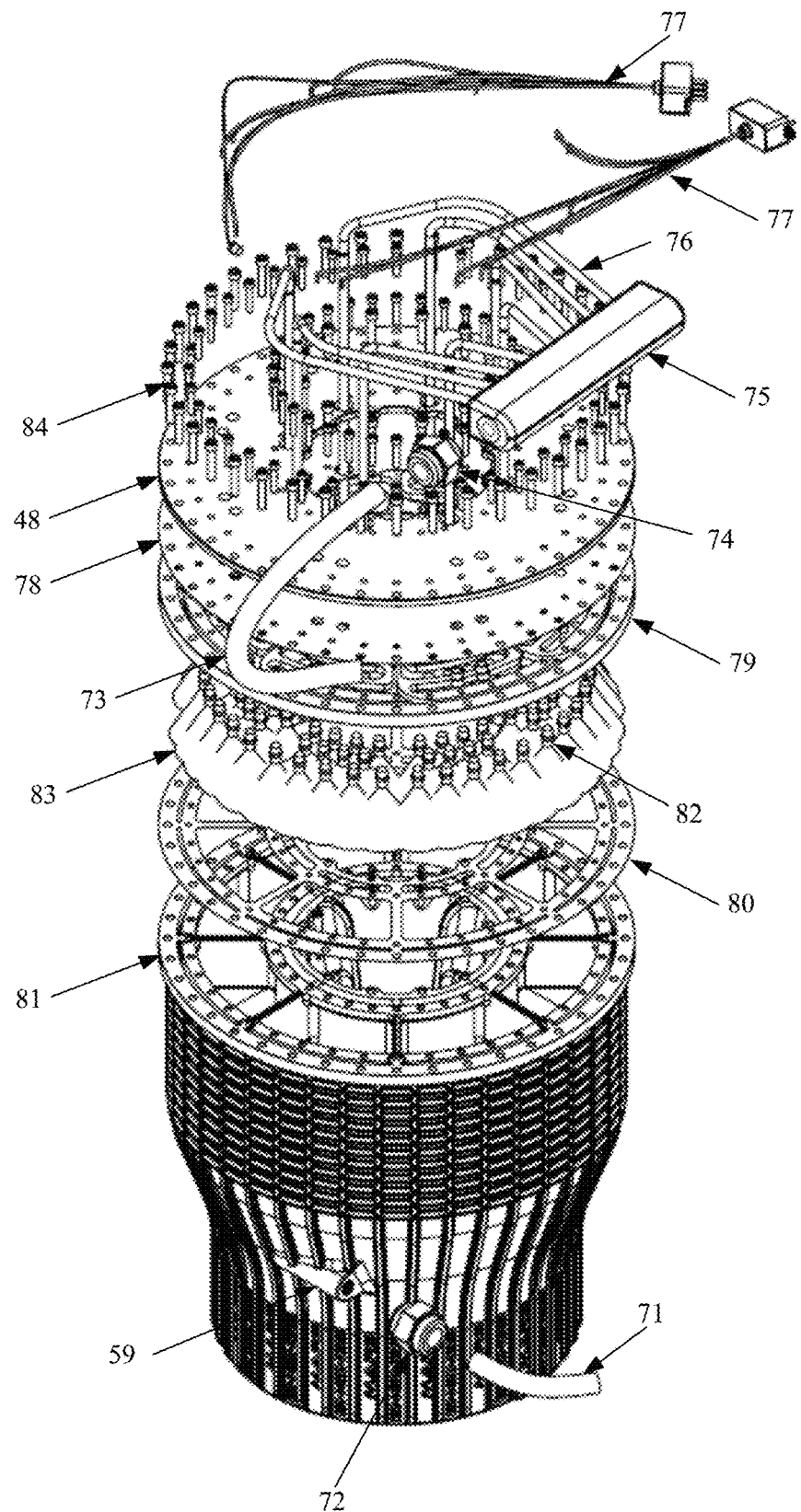
FIG. 11B is an exploded view of an engine assembly that includes the engine of FIGS. 11A and 12.

FIG. 11B is an exploded view of an engine assembly that includes the engine of FIGS. 11A and 12, along with hardware associated with use of the engine on a vehicle. Two types of propellant are used in the engine for combustion: fuel and oxidizer. A first type of propellant, i.e., fuel or oxidizer, is introduced into the engine via a propellant tube 71, hydraulic coupler 72 and propellant inlet 59. The other type of propellant is introduced into the engine via propellant tube 73, hydraulic coupler 74, manifold 75 and propellant delivery tubes 76. In at least some embodiments, fuel is introduced into the engine via propellant tube 71, hydraulic coupler 72 and propellant inlet 59; and oxidizer is introduced into the engine via propellant tube 73, hydraulic coupler 74, manifold 75 and propellant delivery tubes 76. In other embodiments, however, this arrangement may be reversed.

Ignition and sensor harnessing 77 is passed through through-holes in the thrust plate 48, thrust plate gasket 78 and hydraulic distribution plate (HDP) 79, to allow ignitors to be positioned within the annular primary thrust chamber (not shown). The top of the engine's shell is a thrust chamber nozzle 81. A thrust chamber gasket 80 provides hydraulic seal between the HDP 79 and the thrust chamber nozzle 81. As discussed further below, the HDP 79 includes flow channels to distribute pre-combusted liquid fuel and oxidizer, in a manner that facilitates use of fuel and oxidizer for cooling of the primary combustion chamber. Injector nozzles 82 are installed into holes in the HDP 79 and, in at least some embodiments, are threaded. Each injector nozzle 82 produces a spray pattern 83 of propellant into the annular primary combustion chamber (not shown). The thrust plate gasket 80 is disposed on top of the HDP 79 to provide a seal between the thrust plate 48 and the HDP 79. Fasteners 84 (e.g., socket head hex cap screws) secure the thrust plate 48 and layers below it to the thrust nozzle 81.

Figure 23:
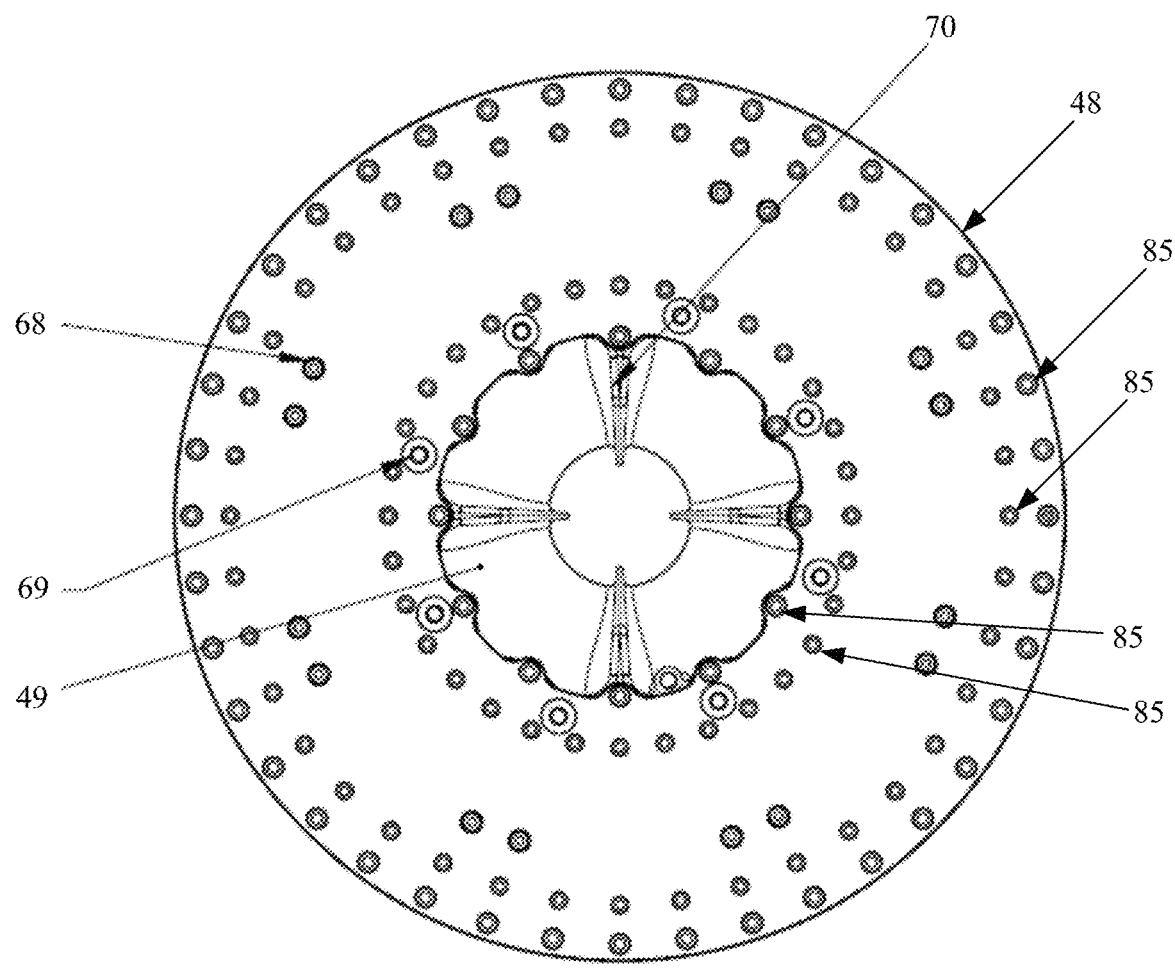
FIG. 23 shows a view of the forward end of the engine according to the second embodiment, as viewed along the longitudinal axis.

FIG. 23 shows a view of the forward end of the engine according to the second embodiment, as viewed along the longitudinal axis, and particularly showing the forward surface of the thrust plate 48. In the illustrated embodiment, 16 ignitor vias 68 in the thrust plate 48 allow electrical wires for the 16 ignitors to pass through the thrust plate 48 to the primary combustion chamber 46 (FIGS. 14 and 15, discussed below). Eight propellant vias 69 allow propellant (e.g., oxidizer) to pass through hydraulic seals (e.g., gaskets 78 and 80; FIG. 11B) and into cooling cavities, as discussed further below. Fluid intake guides 70 within fluid intake manifold 49 laminarize the flow of incoming ambient fluid to prevent the introduction of non-normalized fluid flow. Holes 85 are to receive fasteners 84 for securing the thrust plate 48, HDP 79, and gaskets 78 and 80 to the thrust nozzle 81.

Figure 24:
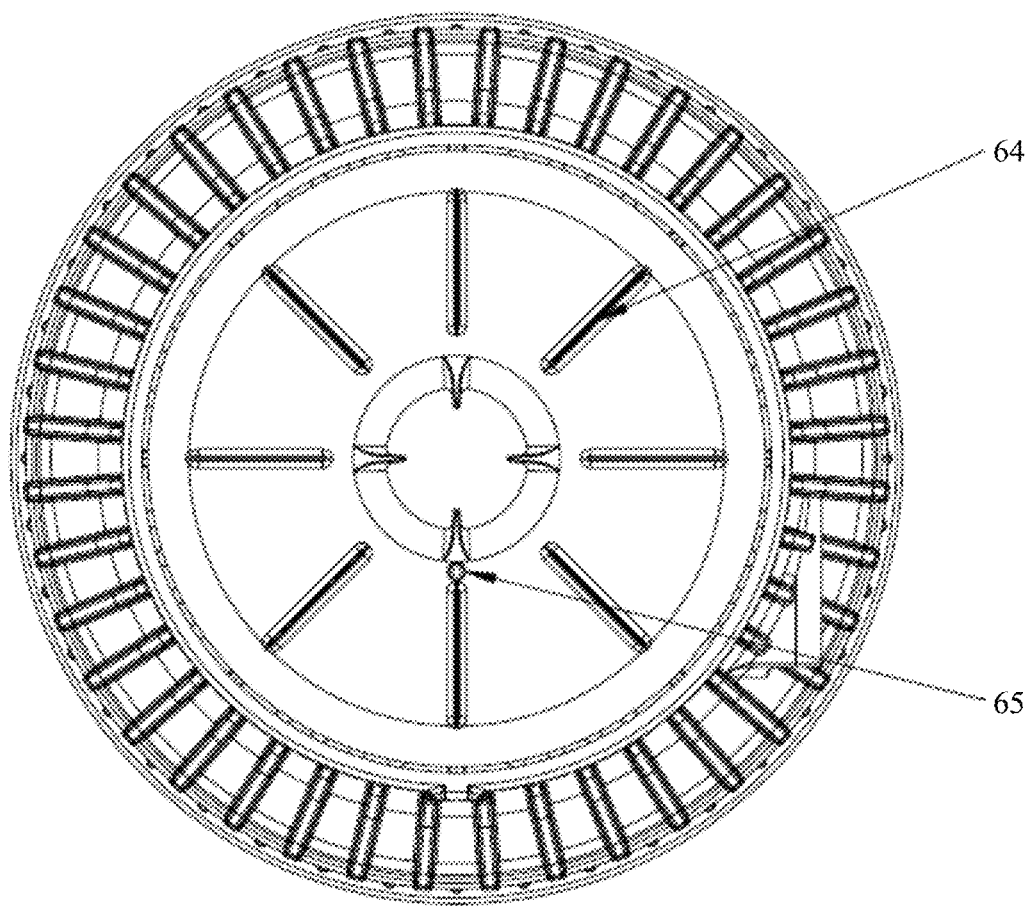
FIG. 24 shows a view of the aft end of the engine according to the second embodiment, as viewed along the longitudinal axis.

FIG. 24 shows a view of the aft end of the engine according to the second embodiment, as viewed along the longitudinal axis. Free-standing radial paddle baffles 64 prevent circumferential movement of combustion gasses in the secondary combustion chamber 58. A flush mounted, inwardly bossed propellant drain 65 is used as an outlet for unused propellant to vent after test, calibration and operation of the engine, and allows removal of propellant residues after cleanout. Because of its flush mount and inwardly bossed configuration, drain 65 does not disturb combustion gases on the surfaces of the secondary combustion chamber 58.

Figure 13:
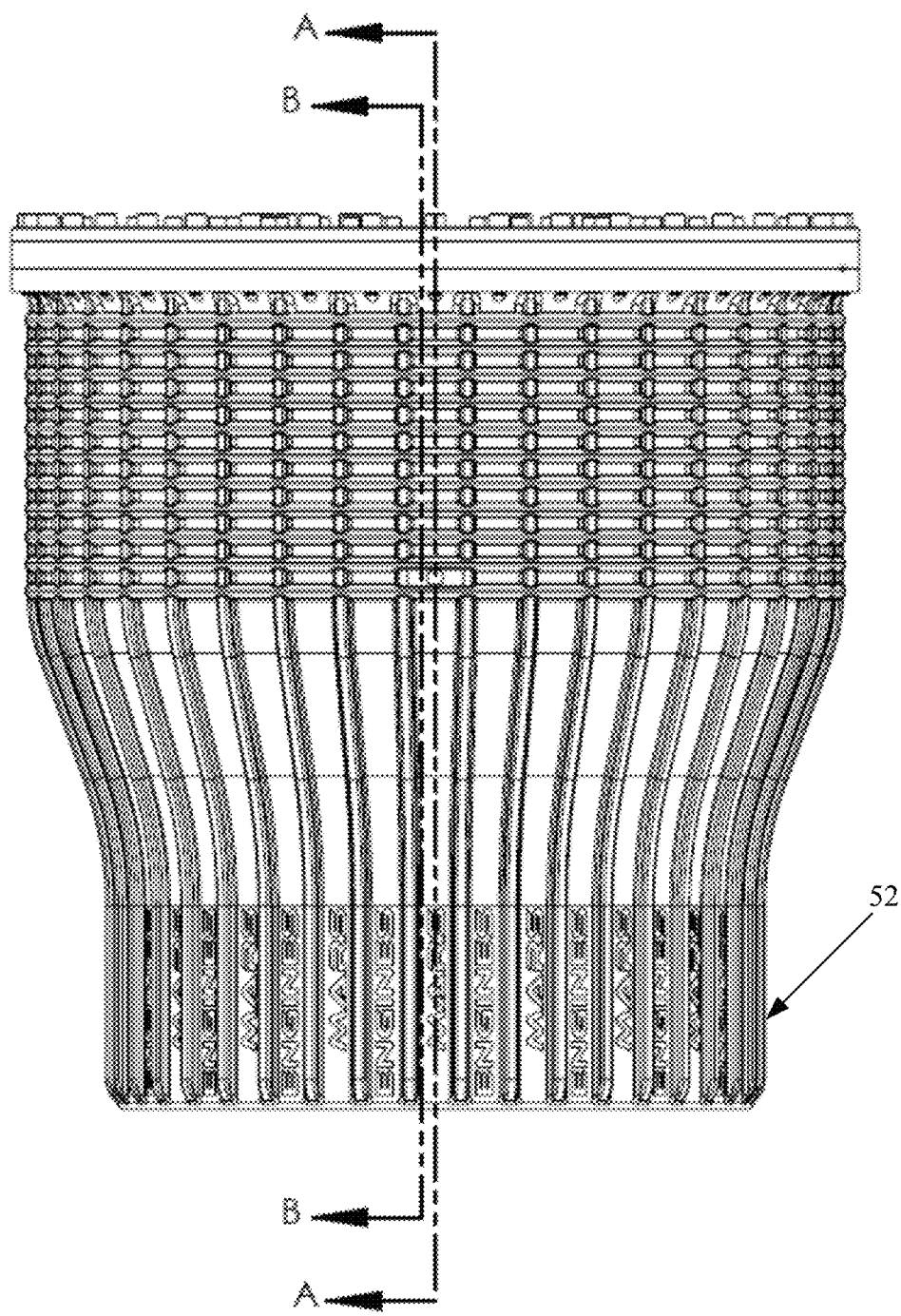
FIG. 13 is a side view of the engine according to the second embodiment.
Figure 17:
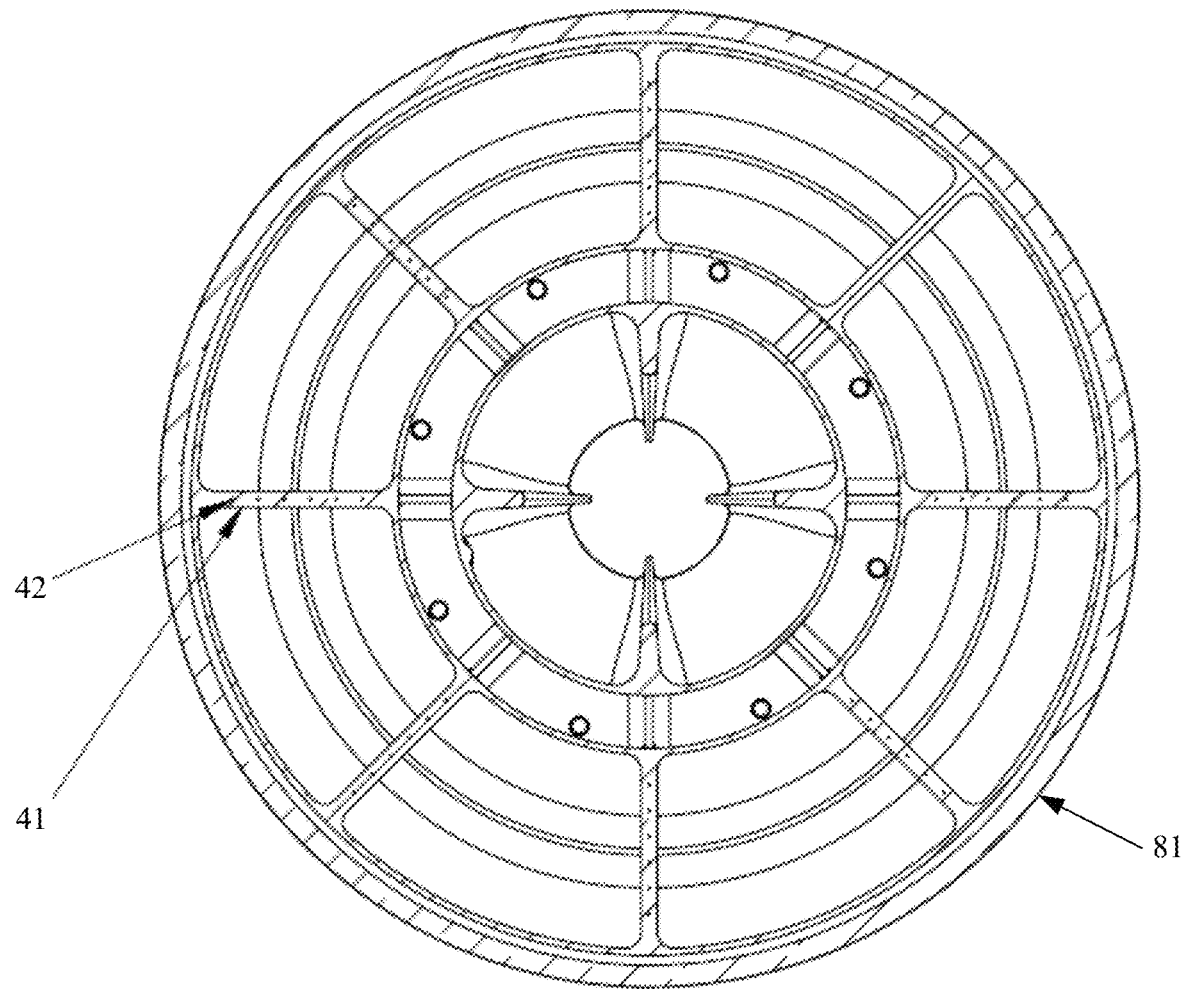
FIG. 17 is a cross-sectional view of the engine according to the second embodiment, corresponding to section line C-C in FIG. 16.

FIG. 13 is a side view of the engine according to the second embodiment. FIG. 14 is a cross-sectional view of the engine according to the second embodiment, corresponding to section line A-A in FIG. 13. As shown in FIG. 14, the engine includes a number of radial baffles 41 that separate the upper portion of the primary combustion chamber 46 (i.e., at the forward end) into wedge-shaped sections. The baffles 41 are radial in that they extend perpendicularly to the axial centerline of the thrust chamber, as also shown in FIG. 17. In at least some implementations the baffles 41 are an integral part of the engine's structure. They prevent whole-chamber conflagration and circumferential movement of combustion gasses. In addition, the baffles 41 provide hoop stiffening and provide fixturing and collocating of the primary combustion chamber 46 and two cold liquid propellant cavities 55 (see FIG. 15) to one another. In at least some embodiments, the baffles 41 extend from the front end of the primary combustion chamber about 2 inches aftward (downward in FIG. 14).

The baffles 41 include longitudinal dribble channels 42, which aid in cooling the baffles 41 in the hot combustion environment by passing pre-combusted propellant through them into the annular primary combustion chamber 46. The narrow interface 44 between the primary combustion chamber 46 and the secondary combustion chamber (also called the "throat" of the primary combustion chamber 46) conserves the thermodynamic properties of the hot combustion gasses, passing them aftward at higher velocity due to its convergent/divergent geometry, and allowing intake of ambient fluid via the central intake 43. Baffle vias 47 allow fluid to move freely around the propellant cavities 55 (see FIG. 15, discussed below) to provide a greater distribution and equalization of temperature gradients around the walls of the cavities 55 and the fluid within the cavity.

FIG. 15 is a cross-sectional view of the engine according to the second embodiment, corresponding to section line B-B in FIG. 13. The thrust plate 48 provides a surface normal to the thrust direction, provides hydraulic sealing to the propellant channels, provides a mounting for the gimbal block, and provides overall structural support. The intake manifold 49 creates an opening to ambient fluid. The funnel-like geometry created by the fluid intake 43 can be, for example, conical (as shown) or parabolic in cross-section. In other embodiments, the fluid intake 43 may have a different shape, such as ovoid, rectangular, tapered ovoid or tapered rectangular. Note that in some embodiments, the geometry of the fluid intake can extend beyond the top face of the engine as an integral or non-integral part of the assembly, i.e., it can also be part of a spacecraft, aircraft or submersible structure.

FIGS. 14 and 15 in combination also show dimensions P through X. In at least some embodiments, these dimensions have the following ratios: P:Q is about 2.4, A:C is about 0.5 B:C is about 0.2, T:U is about 30, and X:W is about 3.2. In FIGS. 14 and 15, according to at least some embodiments, dimension P is about 6.0 inches, dimension Q is about 2.5 inches, dimension R is about 11.0 inches, dimension S is about 9.2 inches, dimension T is about 3.0 inches, and dimension U is about 0.1 inches, dimension V is about 2.0 inches, dimension W is about 4.8 inches, and dimension X is about 15.5 inches. As noted above, the convergent/divergent geometry of the transition region ("interface") between the primary combustion chamber 46 and secondary combustion chamber 58 conserves the thermodynamic properties of the hot combustion gasses, passing them aftward at higher velocity due to its convergent/divergent geometry, and allowing intake of ambient fluid via the central intake 43.

The propellant wall 50 creates a surface to balance semi-isentropic combustion fluids against incoming fluids to create an ideal converging/diverging rocket fluid flow contributing to thrust. The propellant wall 50 creates a portion of the nozzle wall, which along with participating ambient fluid allows a variable divergent nozzle to be formed which dynamically adapts to the temperature, velocity and pressure variations of combustion chamber hot gasses.

The propellant baffle 51 provides structural support, increases strength and stiffness, prevents propellant circumferential flow, spreads heat between surfaces, and allows propellant to flow through. The outer shell of the engine in this embodiment includes an external iso-grid 53, which provides structural support to increase mechanical stiffness and strength of the outer shell, and provides increased surface area to facilitate radiative cooling of the outer surface of the shell.

Propellant cavities 55A and 55B surround the primary combustion chamber 46 (as viewed in cross-section) and are co-annular (concentric) with the primary combustion chamber 46. They receive fluid propellant and serve to provide regenerative cooling of the primary combustion chamber 46, pre-heating of the propellant (for more efficient combustion), and distribution of propellant. In at least some embodiments, propellant cavities 55A and 55B each receive a separate type of propellant under pressure, i.e., one of them receives fuel and the other receives oxidizer. In at least some embodiments, outer propellant cavity 55A receives fuel and inner propellant cavity 55B receives oxidizer. This use of propellant for cooling in this manner prevents the walls of the primary combustion chamber 46 from melting during combustion. Baffle vias 47 (FIG. 14) allow propellant to move freely around inner propellant cavity 55B (FIG. 15) to provide a greater distribution and equalization of temperature gradients around the walls of inner propellant cavity 55B and the propellant within inner propellant cavity 55B. In at least some embodiments, one or both of propellant cavities 55A and 55B are not entirely hollow, but are instead at least partially filled with a structure designed to guide propellant flow toward the HDP 79, such as a mesh or tube structure.

Also shown in FIG. 15 are two of (in this embodiment) eight propellant delivery tubes 54, which channel incoming propellant to the region of inner propellant cavity 55B that is next to the hottest portion of the primary combustion chamber 46. In some implementations each propellant delivery tube 54 is attached to the rest of the structure of the engine, such as by additive manufacturing ("3D printing"), brazing or welding. In other implementations, the propellant delivery tubes 54 can be removable. Hence, the inner propellant cavity 55B and propellant delivery tubes 54 in combination provide a means for cooling the inner exterior surfaces of the primary combustion chamber 46. Similarly, the outer propellant cavity 55A in combination with propellant tube 71, hydraulic coupler 72 and propellant inlet 59 (FIG. 11B) provide a means for cooling the outer exterior surfaces of the primary combustion chamber 46

During operation of the engine, propellant injected into outer propellant cooling cavity 55A eventually propagates upward (according to the perspective shown in FIG. 15), where it passes through holes (not shown) placed around the perimeter of the HDP 79, and is then distributed into flow channels (not shown) on the top (forward) surface of the HDP 79, for distribution into the primary combustion chamber 46. The structure of the HDP 79 is discussed further below in relation to FIGS. 18 through 21. Similarly, propellant injected into inner propellant cooling cavity 55B eventually propagates upward, where it passes through different holes in the HDP 79 and is distributed into different flow channels on the upper (forward) surface of the HDP 79, for distribution into the primary combustion chamber 46. Details of the HDP 79 are discussed further below.

Figure 16:
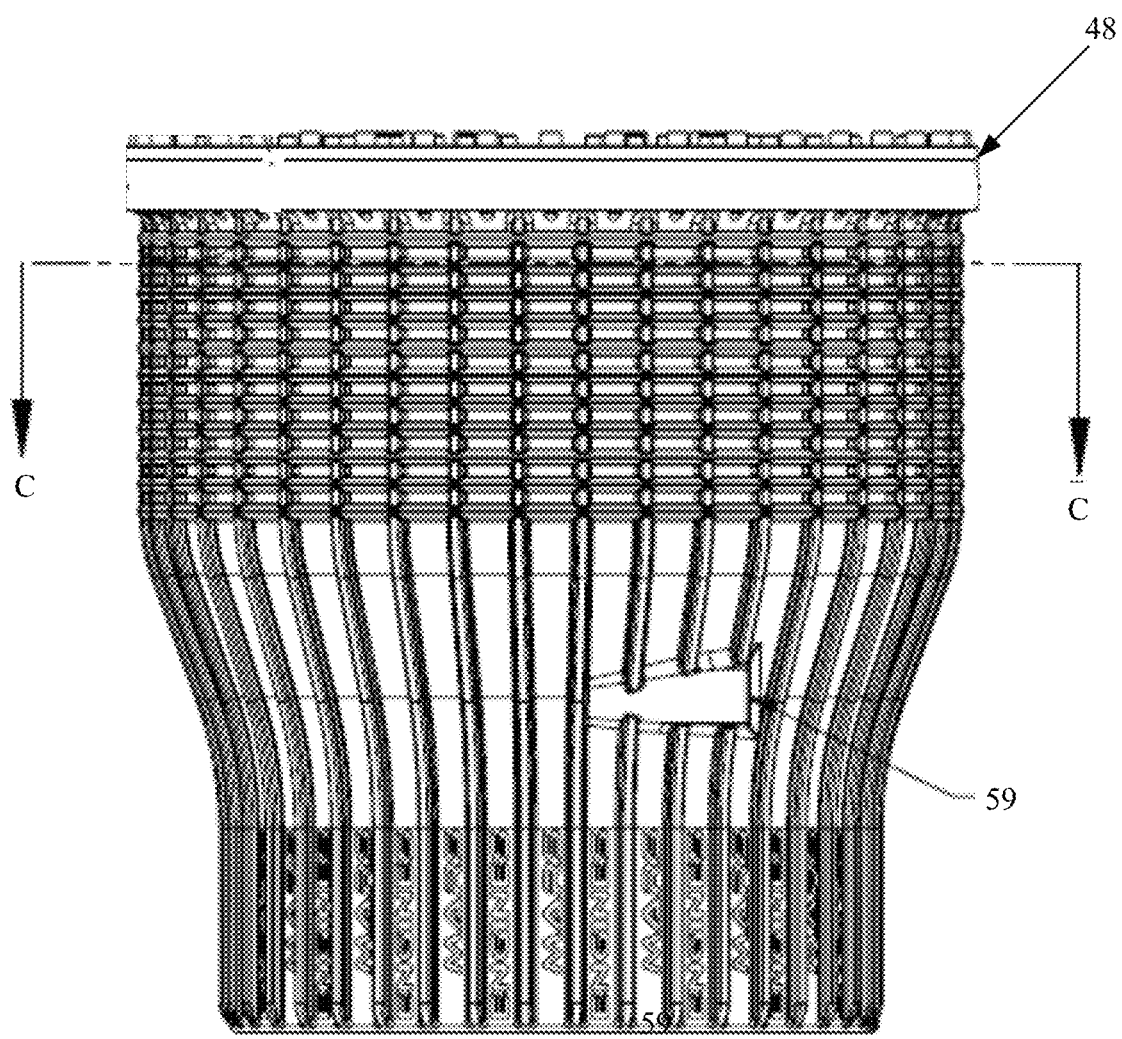
FIG. 16 is a second side view of the engine according to the second embodiment.

The exhaust nozzle 56 can be an adjustable-circumference nozzle (e.g., turkey feathers), which conserves thermodynamic flow properties at various propellant and ambient fluid intake parameters, balances combusted gas pressures against ambient pressures, and adjusts thrust versus velocity conservation. The plane of exhaust manifold 57 provides an exit plane for high-speed hot combustion gasses. Its length and diameter can be chosen to create a nearly isobaric interface between the combustion gasses and external fluids FIG. 16 shows another side view of the engine according to the second embodiment, shown from a different angle than the view of FIG. 13. Propellant inlet 59 introduces propellant at its lowest temperature directly to the hottest portion of the primary combustion chamber 46, i.e., next to the narrow channel (interface) that connects the primary combustion chamber 46 to the secondary combustion chamber 58. FIG. 17 shows the cross-sectional view corresponding to section line C-C in FIG. 16, providing another view of the radial baffles 41 and dribble channels 42 that pass longitudinally through the baffles 41. The radial baffles 41 provide hoop stiffening and separate the primary combustion chamber into wedge-shaped sections, which prevent conflagrated combustion and circumferential flow.

Figure 18:
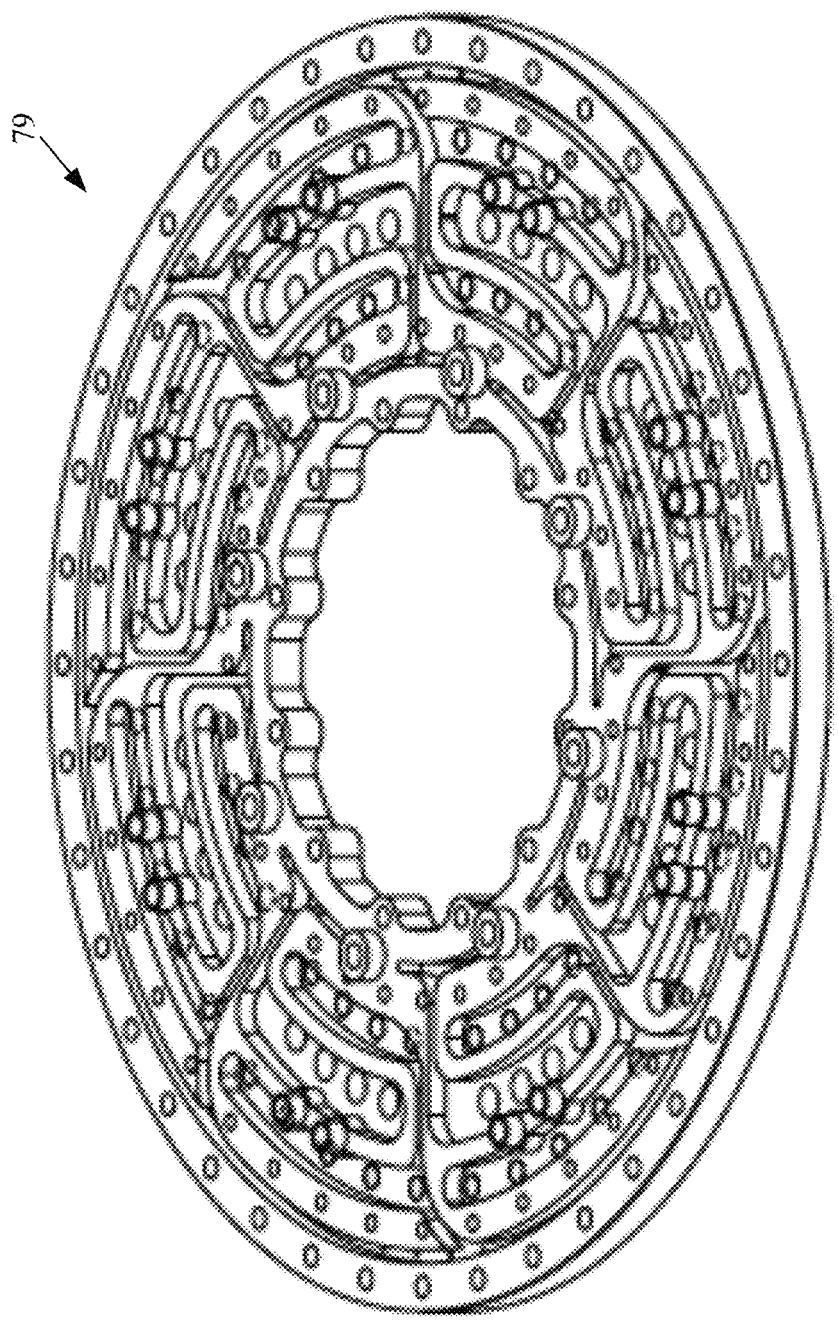
FIG. 18 is a perspective view of the upper surface of the hydraulic distribution plate.
Figure 19:
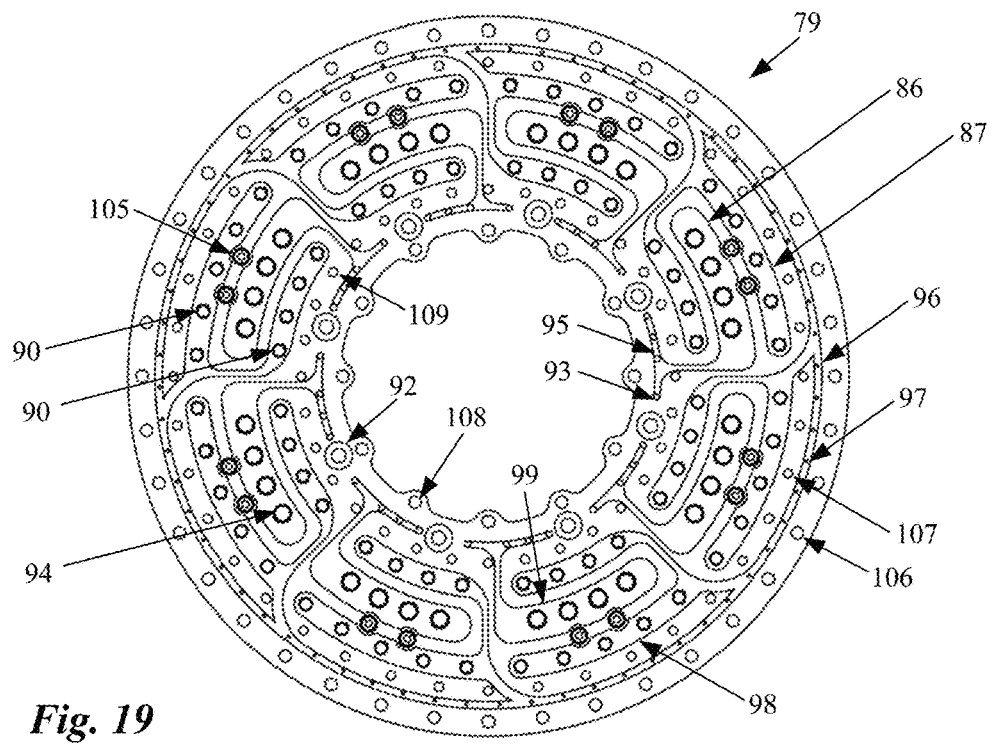
FIG. 19 is an orthogonal view of the top (forward) surface of the hydraulic distribution plate.
Figure 20:
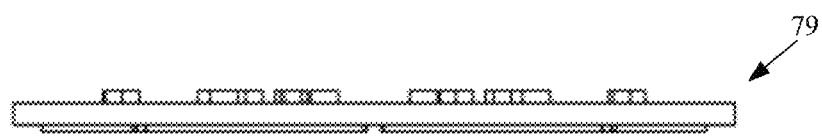
FIG. 20 is an orthogonal view of the side surface of the hydraulic distribution plate.
Figure 21:
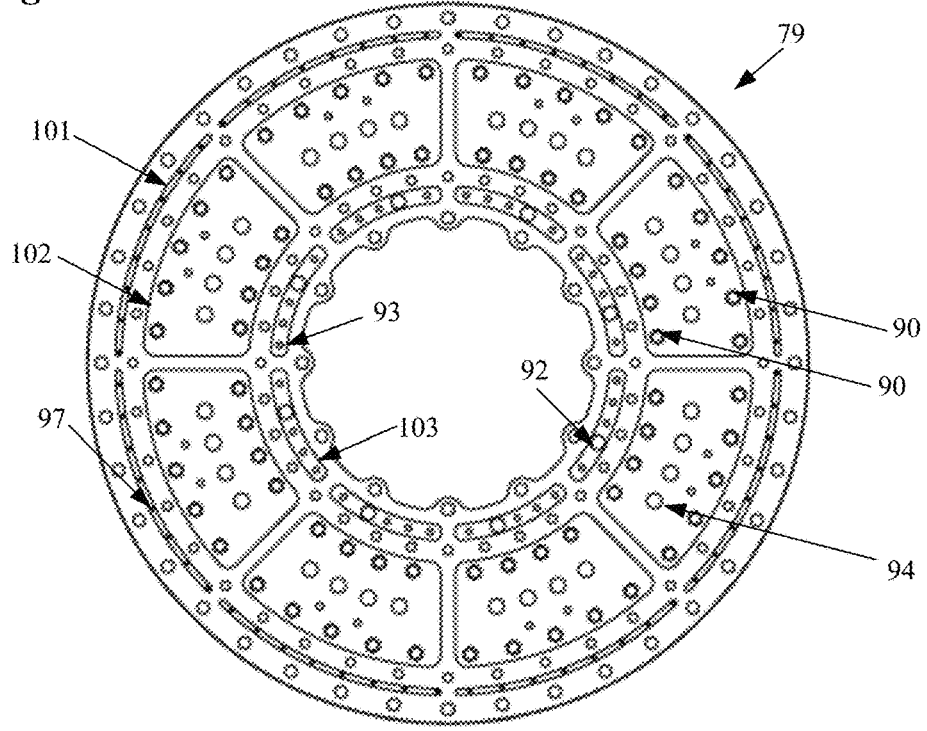
FIG. 21 is an orthogonal view of the bottom (aft) surface of the hydraulic distribution plate.

FIG. 18 shows a perspective view of the upper surface of the HDP 79. The HDP 79 includes ports and flow channels to distribute, separately, pre-combusted fuel and oxidizer. This allows the propellants to cool the exterior surfaces of the annular primary thrust chamber 46 (FIG. 15) and the thrust plate 48, and thereby allows the thrust plate 48 to act as the primary load path to vehicle structure. FIGS. 19, 20 and 21 illustrate three orthogonal views of the HDP 79. Specifically, FIG. 19 is a view of the top (forward) surface of the HDP 79, FIG. 20 is a side view of the HDP 79, and FIG. 21 is the bottom (aft) surface of the HDP 79.

Figure 22:
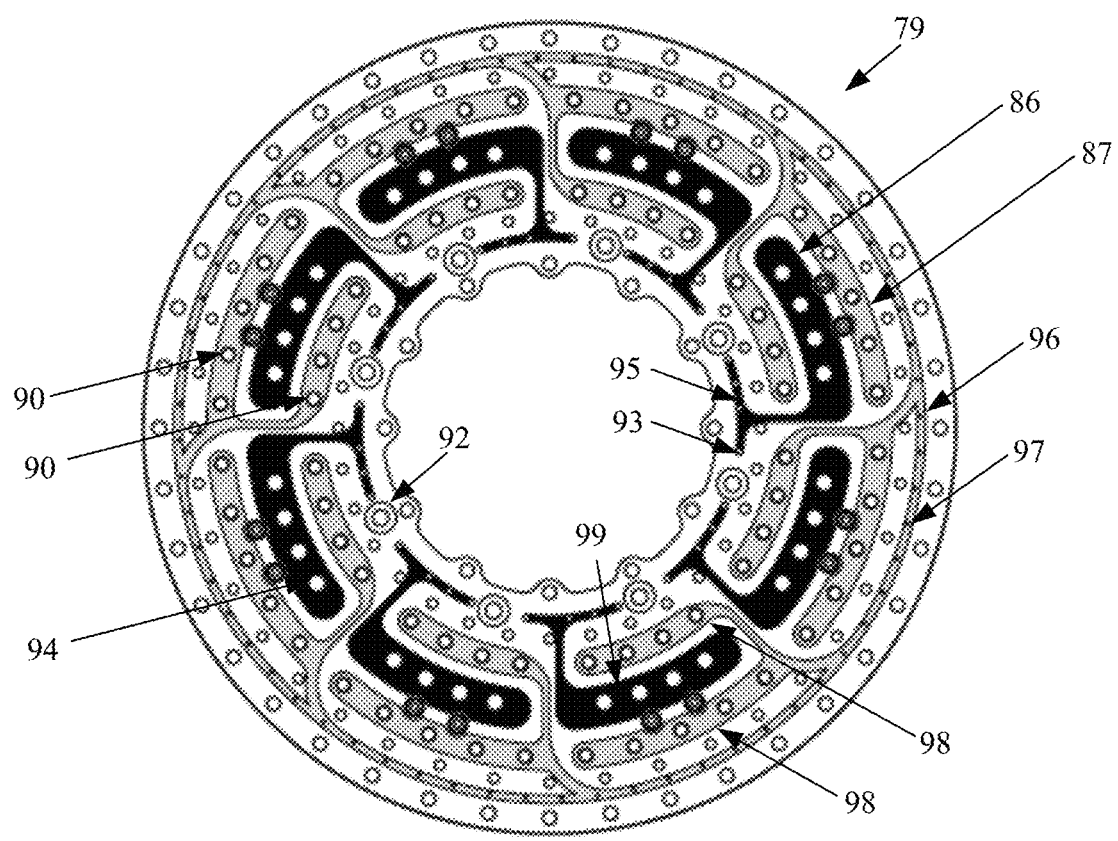
FIG. 22 is an orthogonal view of the top (forward) surface of the hydraulic distribution plate, with shading to identify the two propellant distribution channels.

FIG. 22 is an orthogonal view of the top (forward) surface of the HDP 79, with different shadings to indicate the separate flow channels 86 and 87 used for fuel and oxidizer. Each of flow channels 86 and 87 has multiple segments/branches/portions. In at least some embodiments, the darker-shaded flow channel 86 in FIG. 19 is used to distribute oxidizer, while the lighter-shaded flow channel 87 is used to distribute fuel. This configuration places the fuel injector nozzles (not shown) closer to the walls of the annular primary combustion chamber 46 (not shown), which causes some of the fuel to be sprayed onto the interior walls of the annular primary combustion chamber 46, helping to cool them. In other embodiments, the assignment of propellant flow channels 86 and 87 to oxidizer and fuel may be reversed.

It can be seen from FIG. 19 that propellant flow channel 86 includes a number of thin partial-ring segments 95 close to the central air gap. Those partial-ring segments 95 include through-holes 93 that are used to collect propellant returning from inner propellant cavity 55B (not shown), which is located between the annular primary combustion chamber 46 and the central ambient fluid intake. Additionally, flow channel 86 includes a number of wide partial-ring segments 99 positioned radially outward from the partial-ring segments 95, and each of which is connected to (in fluid communication with) a separate one of the partial-ring segments 95. The outer partial-ring segments of flow channel 86 include through-holes 94, which are used to contain injection nozzles (not shown) for injecting propellant flowing in flow channel 86 into the primary combustion chamber 46.

Propellant flow channel 87 includes a thin outer ring 96, which includes through-holes 97 that are used to collect propellant returning from outer propellant cavity 55A (FIGS. 14 and 15), which is located between the engine shell and the primary combustion chamber 46. The outer ring 96 is connected to (in fluid communication with) two sets of inner partial-ring segments 98, which are interleaved radially with the outer partial-ring segments 99 of the other propellant flow channel, i.e., flow channel 86. The inner partial-ring segments 98 of flow channel 87 include through-holes 90, which are used to contain injection nozzles (not shown) for injecting propellant flowing in flow channel 87 into the primary combustion chamber 46.

During operation of the engine, one type of propellant (such as fuel, for example), which has been injected into the outer propellant cavity 55A (FIGS. 14 and 15), flows upward (forward) under pressure (helping to cool the outer exterior surface of the primary combustion chamber 46) and eventually reaches the bottom surface of the HDP 79. From there, the propellant continues to flow upward through holes 97 in the HDP 79, emerging into the outer ring 96 of flow channel 87 in the top surface of HDP 79. From there, the propellant flows through flow channel 87 to the inner partial-ring segments 98 of flow channel 87, and eventually to a first set of propellant injector nozzles (not shown) in propellant injector ports 90, which inject the propellant into the primary combustion chamber 46.

The other type of propellant (such as oxidizer, for example) is initially injected into the inner propellant cavity 55B via injection tubes 54 (FIG. 15), which pass through holes 92 in the HDP 79. The propellant helps to cool the inner exterior surface of the primary combustion chamber 46 and flows upward (forward) under pressure to reach the bottom surface of the HDP 79. From there, the propellant flows upward through holes 93 in the HDP 79, emerging into the innermost partial-ring segments 95 of flow channel 86 in the top surface of HDP 79. The propellant then flows through flow channel 86 to the outer branches of flow channel 86, and eventually to a second set of propellant injector nozzles (not shown) in propellant injector ports 94, which inject the propellant into the primary combustion chamber 46.

Note that in this design, importantly, the fuel and oxidizer do not mix until they are inside the primary combustion chamber 46. The thrust plate gasket 78 and thrust chamber gasket 80 (FIG. 11B), held in place by the thrust plate 48 and fasteners 84, ensure that a proper seal is maintained so that propellants flowing through or on the HDP 79 cannot mix with each other.

Referring still to FIG. 19, the HDP 79 also includes a set of vias (through-holes) 105 to accommodate wiring for the ignitors (not shown). The HDP 79 further includes various sets of fastener through-holes 106, 107 108 and 109, to accommodate fasteners that secure the HDP 79, thrust plate 48, thrust plate gasket 78 and thrust chamber gasket 80 to the thrust chamber nozzle 81.

Referring now to FIG. 21, outwardly bossed (raised) surfaces 101, 102 and 103 on the bottom (aft) surface of the HDP 79 protrude slightly into the cavities below the HDP 79 (when installed), to provide circumferential and radial support and locational features, to provide protection against thermal gradient deformation, and to provide structural support.

Although at least one embodiment of the engine has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. An engine comprising:
   a shell;
   an intake, situated within the shell, and having an aperture through which to draw ambient fluid into the engine;
   a first combustion chamber, situated within the shell, in which to combust a mixture of fuel and liquid oxidizer, wherein the first combustion chamber is disposed annularly about a thrust axis of the engine;
   a second combustion chamber downstream from and in fluid communication with the intake and the first combustion chamber; and
   a first cavity defined at least partially by a first exterior surface of the first combustion chamber, and arranged to receive the fuel or the liquid oxidizer to act as a cooling agent to cool the first exterior surface of the first combustion chamber, wherein the first cavity is disposed annularly about the thrust axis of the engine, closer to the thrust axis than the first combustion chamber, and the first combustion chamber and the first cavity share a common wall;
   wherein in a cross-sectional plane that contains the thrust axis,
   the first cavity is elongate along the thrust axis and has a bulbous aftward end, and
   the common wall defines at least a portion of the bulbous aftward end of the first cavity and defines at least a portion of a tapered aftmost end of the first combustion chamber.

2. An engine as recited in claim 1, further comprising a second cavity defined at least partially by a second exterior surface of the first combustion chamber, and arranged to receive the fuel or the liquid oxidizer to act as a cooling agent to cool the second exterior surface of the first combustion chamber.

3. An engine as recited in claim 1, further comprising: an intake, situated within the shell and surrounded by the first combustion chamber in a plane perpendicular to the thrust axis of the engine, the intake having an aperture through which to draw ambient fluid into the engine; and a second combustion chamber in fluid communication with the intake and the first combustion chamber.

4. An engine as recited in claim 1, further comprising: a plate disposed across a forward end of the engine, the plate including a port through which propellant is configured to be injected into the engine during operation of the engine, wherein the port is in fluid communication with the first cavity.

5. An engine as recited in claim 4, further comprising a conduit to deliver the fuel or the liquid oxidizer received through the port to a location within the first cavity that is adjacent to a hottest portion of the first combustion chamber during operation of the engine.

6. An engine as recited in claim 4, wherein the plate comprises a plurality of channels defined in a surface of the plate, through which to allow the fuel or the liquid oxidizer to flow.

7. An engine as recited in claim 6, wherein the plurality of channels comprises:
   a first channel defined in the surface of the plate, through which to allow a first selected one of fuel or oxidizer to flow; and
   a second channel defined in the surface of the plate, through which to allow a second selected one of fuel or oxidizer to flow, wherein the second channel is isolated from the first channel.

8. An engine as recited in claim 1, wherein the first cavity has an elongate forward portion that increases in cross-sectional width linearly in an afterward direction of the engine, and wherein the elongate forward portion transitions into the bulbous aftward end, which increases in cross-sectional width non-linearly in the afterward direction of the engine.

9. An engine as recited in claim 1, further comprising: an elongate tube protruding into the first cavity substantially parallel to the thrust axis, to deliver the fuel or the liquid oxidizer to a location within the first cavity proximal to an aftward portion of the first cavity.

10. An engine comprising:
    a shell;
    an first intake, situated within the shell, and having an aperture through which to draw ambient fluid into the engine;
    an first combustion chamber, situated within the shell and surrounding at least a portion of the intake and disposed annularly about a thrust axis of the engine, in which to combust a mixture of fuel and liquid oxidizer;
    a second combustion chamber, situated within the shell and downstream from and in fluid communication with the intake and the first combustion chamber;

a first cavity defined at least partially by a first exterior surface of the first combustion chamber and disposed between the first combustion chamber and the intake, to receive the fuel or the liquid oxidizer introduced into the engine to cool the first exterior surface of the annular combustion chamber; and a second cavity defined at least partially by a second exterior surface of the annular combustion chamber and disposed between the annular combustion chamber and the shell, to receive the fuel or the liquid oxidizer introduced into the engine to cool the second exterior surface of the annular combustion chamber, wherein in a cross-sectional plane that contains the thrust axis, the first cavity is elongate along the thrust axis and has a bulbous aftward end, and the bulbous aftward end of the first cavity defines at least a portion of a tapered aftmost end of the first combustion chamber.

11. An engine as recited in claim 10, further comprising: a plate disposed across a forward end of the engine, the plate including a port through which oxidizer or fuel is configured to be injected into the engine during operation of the engine, wherein the port is in fluid communication with the first cavity.

12. An engine as recited in claim 11, further comprising a tubular conduit protruding aftward from the plate into the first cavity, to deliver the fuel or the liquid oxidizer received through the port to a location proximal to an aftward portion of the first cavity.

13. An engine as recited in claim 12, wherein the plate comprises a plurality of channels defined in a surface of the plate, through which to allow fuel and liquid oxidizer to flow.

14. An engine as recited in claim 13, wherein the plurality of channels comprises:

a first channel defined in the surface of the plate, through which to allow a first selected one of fuel or oxidizer to flow; and a second channel defined in the surface of the plate, through which to allow a second selected one of fuel or oxidizer to flow, wherein the second channel is isolated from the first channel.

15. An engine as recited in claim 10, wherein the first cavity has an elongate forward portion that increases in cross-sectional width linearly in an afterward direction of the engine, and wherein the elongate forward portion transitions into the bulbous aftward end, which increases in cross-sectional width non-linearly in the afterward direction of the engine.

* * * * *